US008676934B2

(12) United States Patent
Takakura

(10) Patent No.: US 8,676,934 B2
(45) Date of Patent: Mar. 18, 2014

(54) COMMUNICATION DEVICE, SERVER, PROGRAM, AND COMMUNICATION SYSTEM

(75) Inventor: Hiroki Takakura, Tokyo (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 12/687,449

(22) Filed: Jan. 14, 2010

(65) Prior Publication Data

US 2010/0205279 A1 Aug. 12, 2010

(30) Foreign Application Priority Data

Feb. 12, 2009 (JP) ................................. 2009-030112

(51) Int. Cl.
*G06F 15/16* (2006.01)
(52) U.S. Cl.
USPC ............................ 709/219; 709/203; 707/769
(58) Field of Classification Search
USPC ................... 709/203, 219, 200, 217; 707/769
See application file for complete search history.

(56) References Cited

U.S. PATENT DOCUMENTS

| 2005/0141541 | A1* | 6/2005 | Cuny et al. ................... 370/437 |
| 2008/0001945 | A1* | 1/2008 | Kashito et al. ............... 345/418 |
| 2008/0208974 | A1* | 8/2008 | Belimpasakis ............... 709/205 |
| 2009/0106279 | A1* | 4/2009 | Bae .............................. 707/100 |

FOREIGN PATENT DOCUMENTS

| JP | 2002-32280 | 1/2002 |
| JP | 2004-30423 | 1/2004 |
| JP | 2008-211732 | 9/2008 |
| JP | 2009-20699 | 1/2009 |

OTHER PUBLICATIONS

U.S. Appl. No. 12/995,628, filed Dec. 1, 2010, Takakura, et al.
U.S. Appl. No. 13/644,946, filed Oct. 4, 2012, Takakura, et al.

* cited by examiner

*Primary Examiner* — El Hadji Sall
(74) *Attorney, Agent, or Firm* — Oblon, Spivak, McClelland, Maier & Neustadt, L.L.P.

(57) ABSTRACT

A communication device including: a communication unit; and a control unit controlling the communication unit to inquire if one upload service allows direct upload to a server storing service information of each of a plurality of upload services, to have the communication unit obtain desired information from the server for directly uploading data to the one upload service when the one upload service allows direct upload, and to have the communication unit directly upload data to the one upload service according to the desired information.

21 Claims, 18 Drawing Sheets

FIG. 3

| | SUPPORTED FORMAT | | PUBLISH/ UNPUBLISH SETTING | ALBUM FUNCTION | ALBUM TITLE INPUT | IMAGE TITLE INPUT | IMAGE DESCRIPTION INPUT | TAG INPUT | LOGIN PARAMETER |
|---|---|---|---|---|---|---|---|---|---|
| | STILL IMAGE | VIDEO IMAGE | | | | | | | |
| UPLOAD SERVICE A | ○ | × | ○ | ○ | ○ | ○ | ○ | × | EMAIL ADDRESS/ PASSWORD |
| UPLOAD SERVICE B | × | ○ | × | × | — | ○ | × | ○ | ID/PASSWORD |
| UPLOAD SERVICE C | ○ | ○ | ○ | × | — | ○ | × | × | ID/PASSWORD EMAIL ADDRESS |

FIG. 4

| | STILL IMAGE MAXIMUM SIZE | VIDEO IMAGE MAXIMUM SIZE | VIDEO IMAGE MAXIMUM TIME PERIOD | MAXIMUM NUMBER OF CONTENTS | SERVICE LOGO | SERVICE TRADEMARK TEXT | UPLOAD ORDER | DIRECT UPLOAD SUPPORT | AUTOMATIC PROCESS IN SERVER |
|---|---|---|---|---|---|---|---|---|---|
| UPLOAD SERVICE A | 5 MB | – | – | 100 | serviceA.jpg | UPLOAD SERVICE A IS A TRADEMARK | ASCENDING ORDER | × | AUTOMATICALLY SELECT "Home Video" AS CATEGORY |
| UPLOAD SERVICE B | – | 100 MB | 10 MINUTES | 20 | serviceB.jpg | – | DESCENDING ORDER | ○ | NONE IN PARTICULAR |
| UPLOAD SERVICE C | 10 MB | 100 MB | 5 MINUTES | 10 | serviceC.jpg | UPLOAD SERVICE C IS A TRADEMARK | DESCENDING ORDER | ○ | NONE IN PARTICULAR |

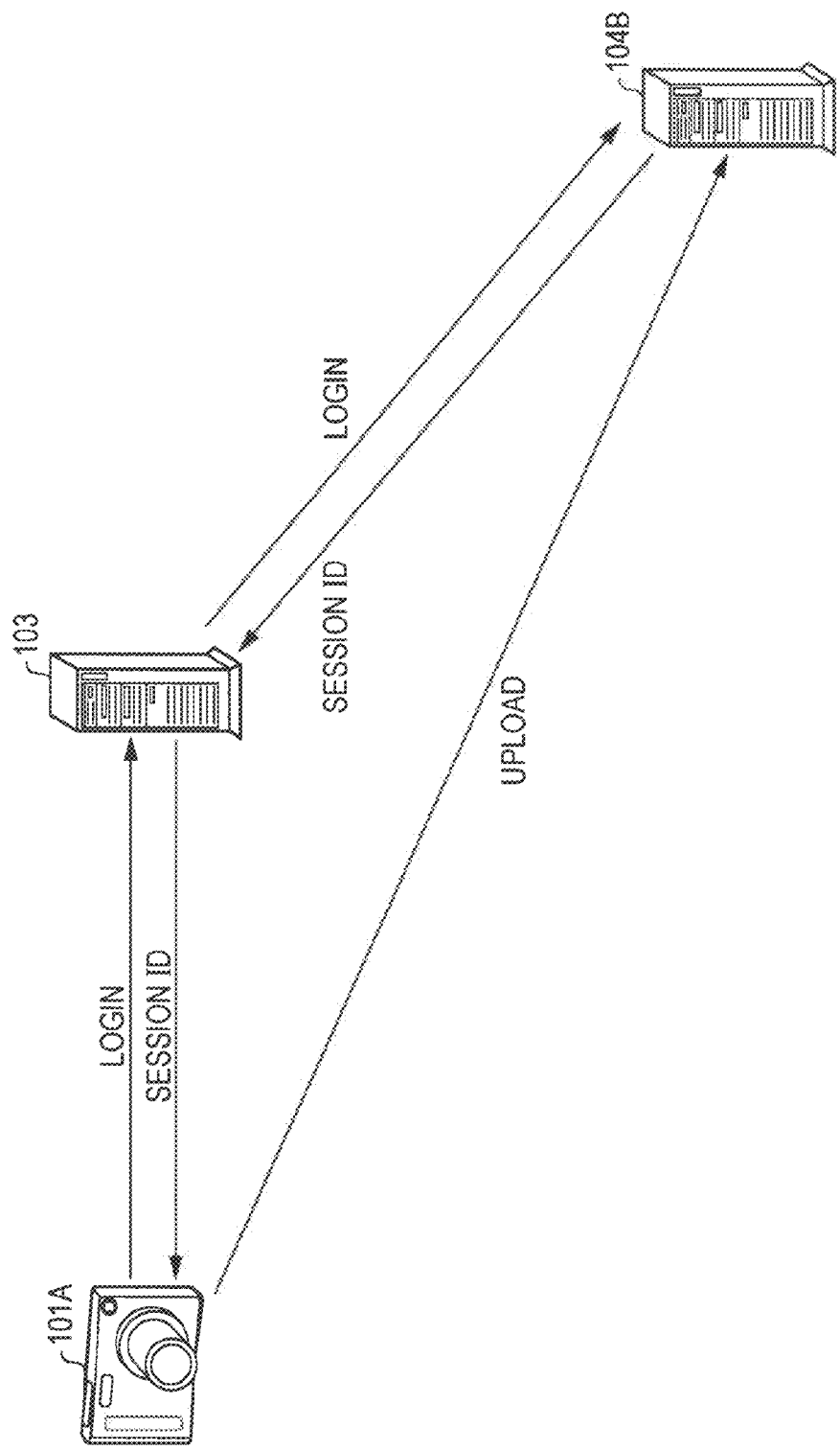

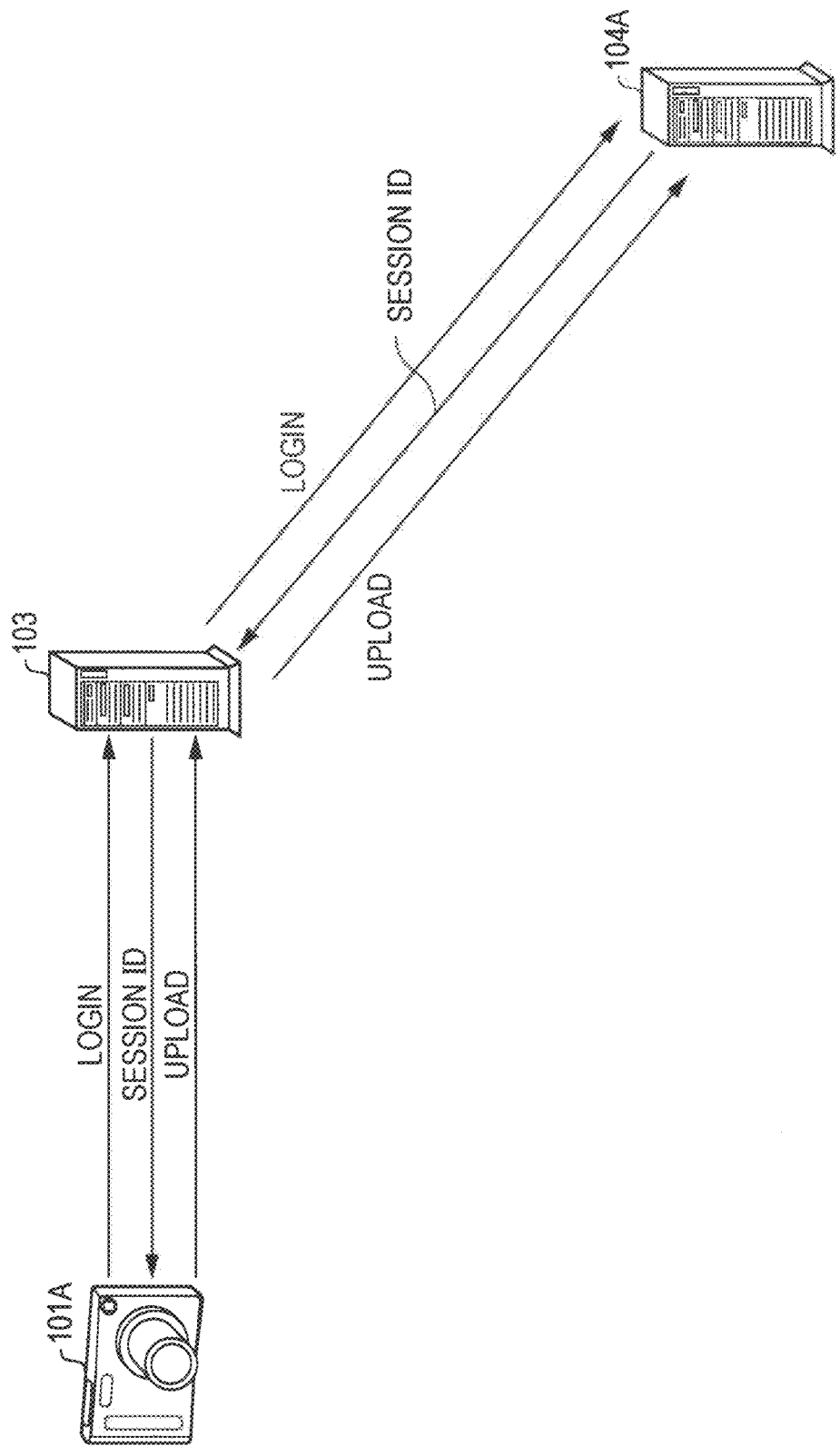

FIG. 9

COMMUNICATION DEVICE, SERVER, PROGRAM, AND COMMUNICATION SYSTEM

BACKGROUND OF THE INVENTION

1. Field of the Invention

The present invention relates to a communication device, a server, a program, and a communication system, which are suitably applicable when, for example, data is uploaded from a communication device.

2. Description of the Related Art

Recently, various services are provided via networks. As an example, there is a service of uploading content data, such as a video image taken by a user, from a terminal of the user (which may also be referred to as a client) to a server on a network for making an archive. Such a service may also be referred to as an upload service. The server to which to upload content data in a service of this type may also be referred to as the service providing server.

In many upload services, it is possible to publish content data uploaded to the service providing server to other users, and the content data can then be shared by a plurality of users.

In order to let many users utilize an upload service as described above, it is desirable to enable upload quickly and easily.

In many existing upload services, however, the user usually searches for a web page of a desired service by utilizing a web browser to upload content data, so it is hard to say that upload can be carried out quickly and easily.

In view of the above situation, a system is proposed, not to upload directly from the client to the service providing server, but to upload via a relay server to the service providing server (for example, refer to Japanese Unexamined Patent Application Publication No. 2008-211732).

In this system, the relay server maintains information of various services (such as the address of the service providing server), and a desired service can be selected by accessing from the client to the relay server. When the desired service is selected and the content data to be uploaded is submitted from the client, the relay server transfers it to the service providing server of the selected service for upload.

In this way, in this system, a desired service can be selected just by accessing a relay server; a time, for example, to search for a web page of a desired service can be saved.

SUMMARY OF THE INVENTION

However, in the system described above, since content data is designed to be uploaded to the service providing server of a desired service via the relay server, accesses from clients are concentrated on the relay server. As a result, the load on the relay server increases, and time taken for uploading becomes longer than in direct upload.

In upload services of related art, it is hard to say that uploading can be carried out quickly and easily.

It is desirable to propose a communication device, a server, a program, and a communication system that can perform upload quickly and easily.

According to an embodiment of the present invention, a communication device controls a communication unit to inquire if one upload service allows direct upload to a server having service information of each of a plurality of upload services maintained therein, to make it obtain desired information from the server for directly uploading data to the one upload service when the one upload service allows direct upload, and to make it directly upload data to the upload service according to the desired information.

Thus, compared to a case of uploading via a server as in related art, access concentration on the server can be reduced. Even when an upload service is added or deleted or an upload method is changed, it suffices to update the service information in the server and it is possible to prevent an increase in user tasks in a communication device.

That is, while keeping the ease of upload, which is an advantage in a case of uploading via a server as in related art, upload can be carried out quickly.

Accordingly, it is possible to provide a communication device, a server, a program, and a communication system that enable to upload quickly and easily.

BRIEF DESCRIPTION OF THE DRAWINGS

FIG. 3 is a table for comparing service forms of upload services;

FIG. 4 is another table for comparing service forms of the upload services;

FIG. 5 illustrates a mechanism of direct upload;

FIG. 6 illustrates a mechanism of relay upload;

FIG. 9 illustrates the configuration of a GUI screen;

DESCRIPTION OF THE PREFERRED EMBODIMENTS

A description is given below to preferred modes (referred to below as embodiments) for carrying out embodiments of the present invention. The description is given in the following order:

1. Embodiment
2. Another Embodiment
3. Still Another Embodiments

Embodiment

1-1. Outline of Embodiment

First, a description is given to an outline of an embodiment. After describing the outline, the description moves to specific examples of the embodiment.

Figure 1:
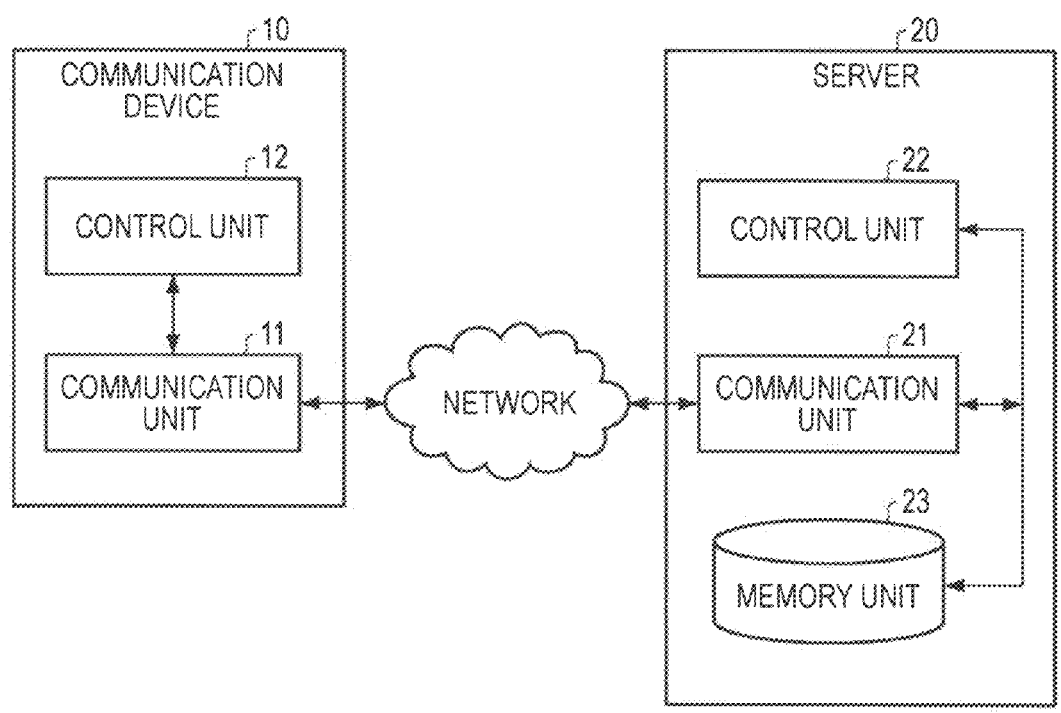
FIG. 1 is a block diagram showing the configuration of a communication system as an outline of an embodiment.

In FIG. 1, the communication system 1 includes a communication device 10 uploading data to an arbitrary upload service and a server 20 storing and maintaining service information of each of a plurality of upload services.

The communication device 10 has a communication unit 11 communicating via a network and a control unit 12 controlling the communication unit 11.

The control unit 12 of the communication device 10 is designed to control the communication unit 11 to inquire if one upload service allows direct upload to the server 20.

When the one upload service allows direct upload as a result of the inquiry, the control unit 12 controls the communication unit 11 to obtain desired information for uploading data directly to the one upload service from the server 20.

The control unit 12 then controls the communication unit 11 according to the desired information to upload data directly to the one upload service. Specifically, it transfers data to an upload location specified by the one upload service.

The server 20 has a communication unit 21 communicating via a network, a control unit 22 controlling the communication unit 21, and a memory unit 23 storing and maintaining service information of each of the plurality of upload services.

The control unit 22 of the server 20 then controls the communication unit 21 to respond to the inquiry if the one upload service allows direct upload from the communication device 10 according to the service information stored and maintained in the memory unit 23.

Further, when the one upload service allows direct upload, the control unit 22 controls the communication unit 21 according to the service information stored and maintained to submit desired information, to the communication device 10, for uploading data directly to the one upload service.

With such a configuration, in the communication system 1, compared to a case of uploading via the server 20 as in related art, it is possible to reduce access concentration on the server 20. In the communication system 1, even when an upload service is added or deleted or an upload method is changed, it suffices to update the service information in the server 20 and it is possible to prevent an increase in user tasks in the communication device 10.

That is, in the communication system 1, while keeping the ease of upload, which is an advantage in a case of uploading via the server 20 as in related art, upload can be carried out quickly.

A detailed description is given below to specific examples of the communication system 1 with such a configuration.

1-2. Specific Examples of Embodiment

1-2-1. Configuration of Upload System

Figure 2:
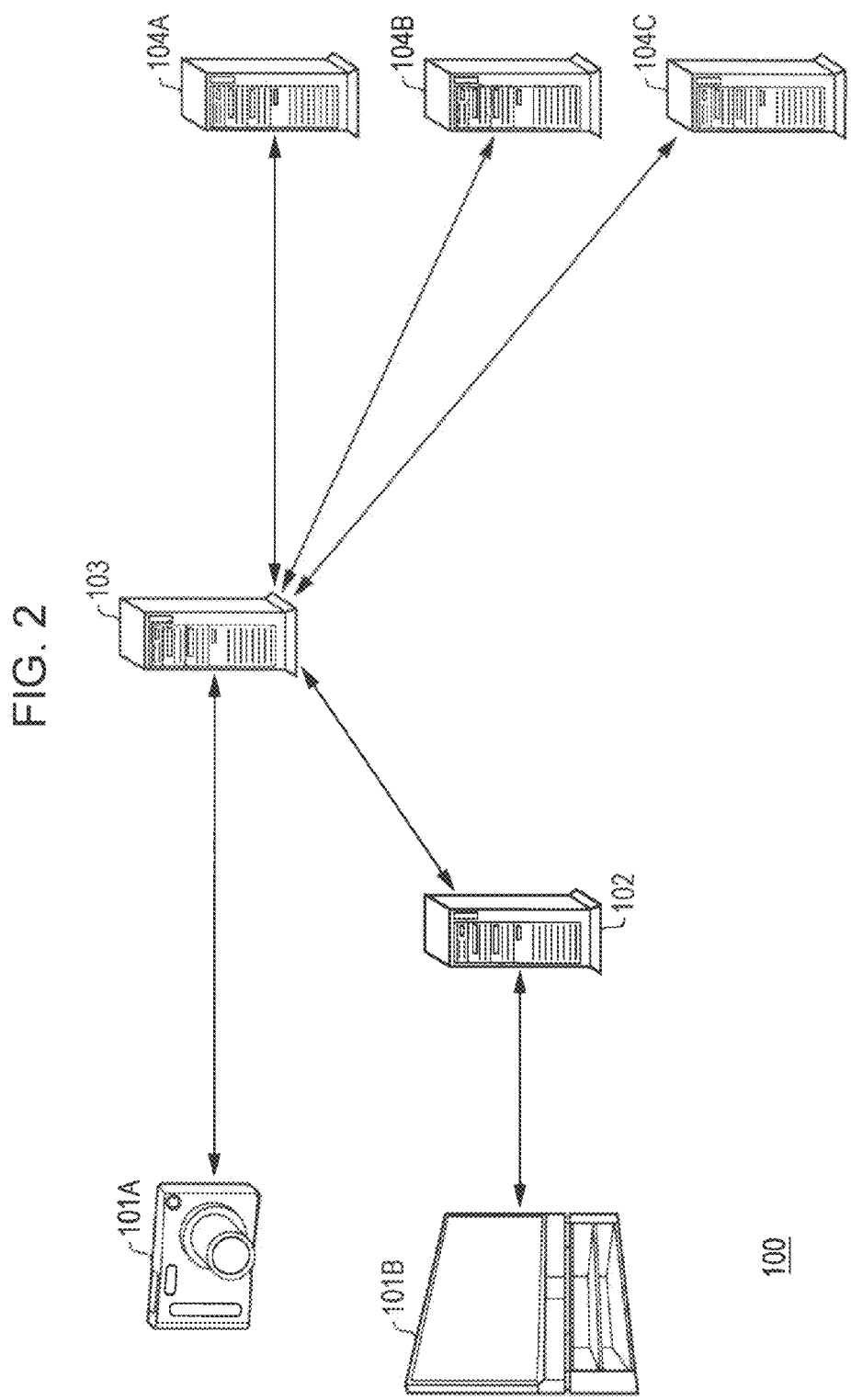
FIG. 2 illustrates configuration of an upload system as a specific example of the embodiment.

Next, a description is given to a configuration of an upload system 100 as a specific example of the present embodiment using FIG. 2.

As illustrated in FIG. 2, the upload system 100 is configured with clients 101 (101A, 101B), a web server 102, a relay server 103, and service providing servers 104 (104A to 104C). These devices have a function of communicating via a network, such as the Internet. Here, the clients 101 are the specific examples of the communication device 10 described above. The relay server 103 is a specific example of the server 20 described above.

The service providing servers 104A to 104C are servers operated respectively by providers A to C providing upload services to users. Specifically, the service providing servers 104A to 104C archive image data uploaded from the clients 101. The image data uploaded to the service providing servers 104A to 104C is managed per uploading user and can not only be browsed freely by the uploading user but can also be published to other users via the network.

Although the respective providers A to C operating each of the service providing servers 104A to 104C are common in the point of providing an upload service for image data, they are different in service forms of the upload services.

Here, a specific description is given to the differences in the service forms of the upload services A to C provided by the providers A to C using FIGS. 3 and 4. As shown in FIGS. 3 and 4, the service forms of each of the upload services A to C can be represented by a plurality of items. In other words, each of the upload services A to C is different in at least a part of the contents shown by the plurality of items, and this indicates the differences in the service forms.

For example, "SUPPORTED FORMAT" is one of the items, which shows which of still image data upload and video image data upload is supported by each of the upload services A to C. For example, the upload service A only supports still image data upload, and that is shown in "SUPPORTED FORMAT". The upload service C supports both still image data upload and video image data upload, and that is shown in "SUPPORTED FORMAT".

"PUBLISH/UNPUBLISH SETTING" shows whether or not each of the upload services A to C allows setting of publishing/unpublishing uploaded image data. For example, the upload service A allows setting of publishing/unpublishing image data, and that is shown in "PUBLISH/UNPUBLISH SETTING". The upload service B does not allow setting of publishing/unpublishing image data, and that is shown in "PUBLISH/UNPUBLISH SETTING".

"ALBUM FUNCTION" shows whether or not each of the upload services A to C has a function of managing a plurality of uploaded image data pieces as an album (which may also be referred to as an album function). For example, the upload service A has an album function, and that is shown in "ALBUM FUNCTION". The upload service B does not have an album function, and that is shown in "ALBUM FUNCTION".

"ALBUM TITLE INPUT" shows whether or not each of the upload services A to C allows inputting a title of an album (that is, an album title) for managing a plurality of uploaded images as an album. For example, the upload service A allows inputting an album title, and that is shown in "ALBUM TITLE INPUT". The upload service B does not allow inputting an album title, and that is shown in "ALBUM TITLE INPUT".

"IMAGE TITLE INPUT" shows whether or not each of the upload services A to C allows inputting a title of uploaded image data (that is, an image title). For example, the upload service A allows inputting an image title, and that is shown in "IMAGE TITLE INPUT".

"IMAGE DESCRIPTION INPUT" shows whether or not each of the upload services A to C allows inputting a description of uploaded image data (that is, an image description). For example, the upload service A allows inputting an image description, and that is shown in "IMAGE DESCRIPTION INPUT". The upload service B does not allow inputting an image description, and that is shown in "IMAGE DESCRIPTION INPUT".

"TAG INPUT" shows whether or not each of the upload services A to C allows inputting a tag of uploaded image data. A tag is information as a key for searching image data.

For example, the upload service A does not allow inputting a tag, and that is shown in "TAG INPUT". The upload service B allows inputting a tag, and that is shown in "TAG INPUT".

"LOGIN PARAMETER" shows a type of a login parameter that each of the upload services A to C requests to the client when uploading image data. For example, the upload service A requests an email address and a password as such a login parameter, and that is shown in "LOGIN PARAMETER". The upload service B requests an ID and a password as such a login parameter, and that is shown in "LOGIN PARAMETER".

"STILL IMAGE MAXIMUM SIZE" in FIG. 4 shows the maximum size of still image data that each of the upload services A to C allows for upload. For example, the upload service A allows uploading still image data of 5 MB at a maximum, and that is shown in "STILL IMAGE MAXIMUM SIZE".

"VIDEO IMAGE MAXIMUM SIZE" shows the maximum size of video image data that each of the upload services A to C allows for upload. For example, the upload service B allows uploading video image data of 100 MB at a maximum, and that is shown in "VIDEO IMAGE MAXIMUM SIZE".

"VIDEO IMAGE MAXIMUM TIME PERIOD" shows the maximum time period of video image data that each of the upload services A to C allows for upload. For example, the upload service B allows uploading video image data of 10 minutes at a maximum, and that is shown in "VIDEO IMAGE MAXIMUM TIME PERIOD".

"MAXIMUM NUMBER OF CONTENTS" shows the maximum number of image data pieces that each of the upload services A to C allows each user to upload. For example, the upload service B allows each user to upload up to 20 image data pieces, and that is shown in "MAXIMUM NUMBER OF CONTENTS".

"SERVICE LOGO" shows an image file of a service logo that is used in each of the upload services A to C.

"SERVICE TRADEMARK TEXT" shows a content of a service trademark text that is used in each of the upload services A to C.

"UPLOAD ORDER" shows the order of uploading image data pieces in each of the upload services A to C.

"DIRECT UPLOAD SUPPORT" shows whether or not each of the upload services A to C supports direct upload.

The direct upload is, as illustrated in FIG. 5, to upload image data from one of the clients 101 to one of the service providing servers 104 not via the relay server 103. In contrast, as illustrated in FIG. 6, to upload image data from one of the clients 101 to one of the service providing servers 104 via the relay server 103 may also be referred to as relay upload.

Although described in detail later, either direct upload or relay upload does login, issuing of an session ID, and the like, via the relay server 103 from the clients 101 to the service providing servers 104. In other words, the relay server 103 plays a role as a common contact point (portal) when utilizing each of the upload services A to C from the clients 101.

Here, for example, the upload service B supports direct upload, and that is shown in "DIRECT UPLOAD SUPPORT". The upload service A does not support direct upload, and that is shown in "DIRECT UPLOAD SUPPORT".

"AUTOMATIC PROCESS IN SERVER" shows a process automatically executed by the service providing servers 104A to 104C when each of the upload services A to C uploads image data.

In such a way, the upload services A to C provided by the providers A to C are respectively different in the service forms, so that they employ different methods of uploading image data.

For example, although both upload services B and C support direct upload, they employ different upload methods.

In other words, the clients 101 are desired to execute direct upload in a method corresponding to each of the upload services B and C.

Accordingly, for example, it is considered to store information desired for direct upload (which may also be referred to as desired information) for utilizing each of the upload services B and C in the clients 101 in advance.

However, in this case, it is not allowed to support adding and deleting an upload service, changing an upload method, and the like. To enable supporting, the desired information should be updated in the clients 101 every time, forcing the users to do such a task.

In the upload system 100, the clients 101 are designed to obtain the desired information corresponding to the utilized upload service from the relay server 103 upon direct upload.

Actually, the relay server 103 is designed to maintain service information related to each of the upload services A to C, and the desired information is obtained from the service information to provide it to the clients 101.

Upon direct upload, the clients 101 access the relay server 103 to obtain desired information corresponding to the utilized upload service and perform direct upload according to the obtained desired information.

Thus, in the upload system 100, even when an upload service is added or deleted or an upload method is changed, it suffices to update the service information in the relay server 103 and labors on the clients 101 can be reduced.

By directly uploading image data to the service providing servers 104 not via the relay server 103 in such a way, it is possible to reduce access concentration on the relay server 103 compared to a case of uploading image data via the relay server 103.

On the other hand, as the upload service A, there is also a service not supporting direct upload. In a case of utilizing such a service, relay upload via the relay server 103 is carried out.

That is, one of the clients 101 submits image data to the relay server 103. The relay server 103 uploads the image data submitted from the client 101 to the service providing server 104A of the upload service A.

The client 101A has a function of directly accessing the relay server 103 and the service providing servers 104A to 104C to upload image data, whereas the client 101B does not have such a function.

Instead, the client 101B has a web browser function, and is designed to be able to upload image data by accessing from a web page provided by the web server 102 to the relay server 103 and the service providing servers 104A to 104C. In other words, the client 101B is designed to provide a function equivalent to the client 101A in cooperation with the web server 102.

In such a way, in the upload system 100, both clients 101A and 101B are designed to be able to upload image data similarly.

1-2-2. Configuration of Clients, Relay Server, and Service Providing Servers

Figure 7:
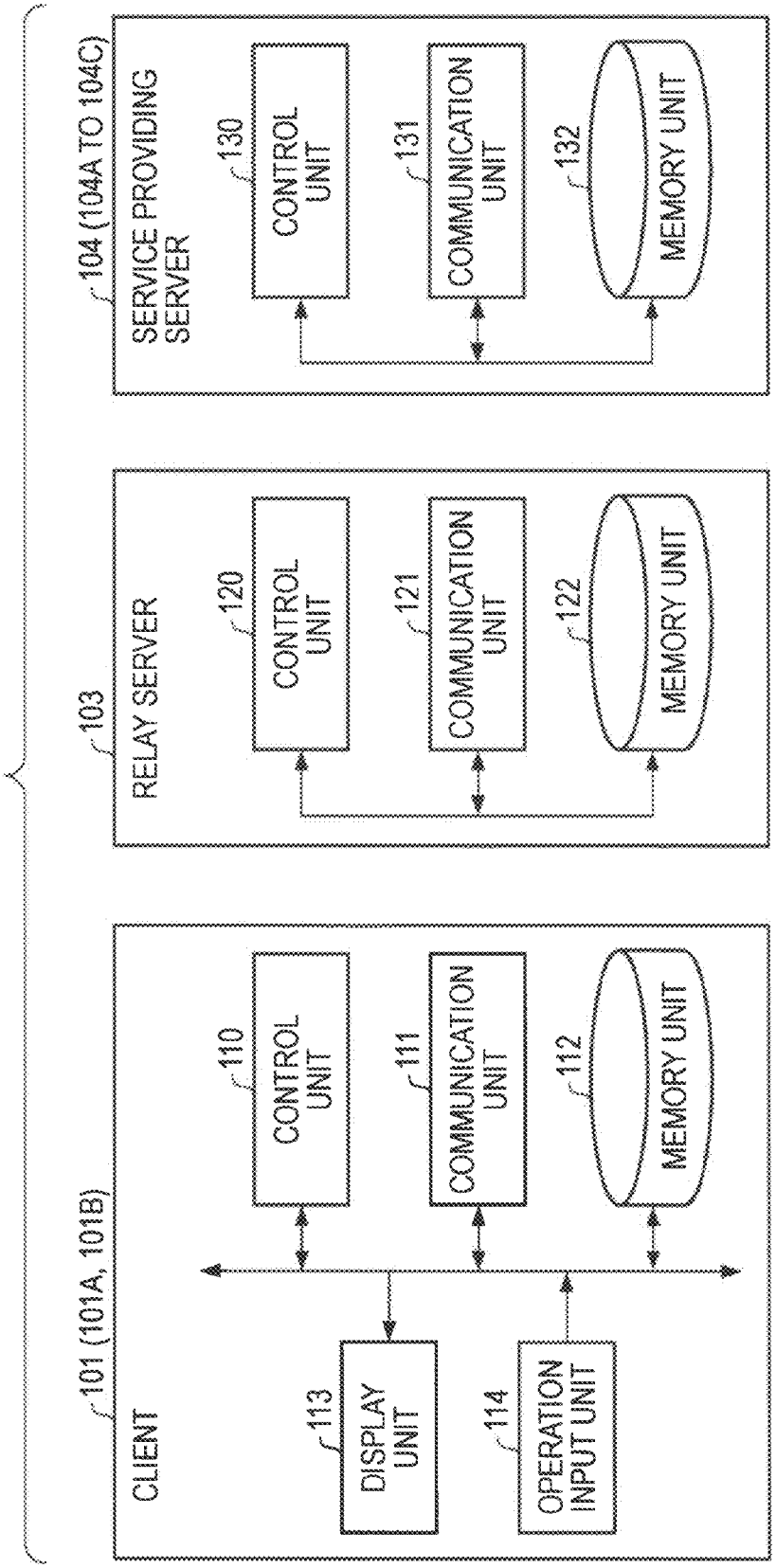
FIG. 7 is block diagrams showing the configurations of a client, a relay server, and a service providing server.

Next, using FIG. 7, a description is given to a configuration of the clients 101, the relay server 103, and the service providing servers 104. The clients 101A and 101B are considered to have an identical configuration. The service providing servers 104A to 104C are also considered to have each identical configuration.

Each of the clients 101 has a control unit 110, a communication unit 111, a memory unit 112, a display unit 113, and an operation input unit 114.

The control unit 110 is configured with, for example, a CPU, a ROM, and a RAM, and integrally controls the whole according to various programs and various APIs, and also executes various processes relating to image data upload (described later in detail). API stands for an application programming interface, which is a program called for executing a particular process. CPU, ROM, and RAM stand for respectively a central processing unit, a read only memory, and a random access memory.

The communication unit 111 communicates with the relay server 103 and the service providing servers 104A to 104C via the network under the control of the control unit 110. The memory unit 112 is, for example, a hard disk drive or a flash memory, and stores various programs, various APIs, various image data pieces, and the like.

The display unit 113 is, for example, a liquid crystal display, and displays a GUI screen with images, icons, and the like disposed thereon under the control of the control unit 110. GUI stands for a graphical user interface. The operation input unit 114 is, for example, operation buttons or touch panels, and accepts a user operation as an input to send a command corresponding to the input to the control unit 110.

Although the client 101B basically has a configuration identical to that of the client 101A, it has a weaker function of executing programs and APIs in comparison with that of the client 101A. The client 101B is designed to provide an execution function equivalent to that of the client 101A by cooperating with the web server 102.

The relay server 103 has a control unit 120, a communication unit 121, and a memory unit 122. The control unit 120 is configured with, for example, a CPU, a ROM, and a RAM, and integrally controls the whole according to various programs and various APIs, and also executes various processes relating to image data upload (described later in detail).

The communication unit 121 communicates with the client 101A, the web server 102, and the service providing servers 104A to 104C via the network under the control of the control unit 120. The memory unit 122 is, for example, a hard disk drive or a flash memory, and stores various programs, various APIs, various image data pieces, service information related to each of the upload services A to C, and the like.

Each of the service providing servers 104 has a control unit 130, a communication unit 131, and a memory unit 132. The control unit 130 is configured with, for example, a CPU, a ROM, and a RAM, and integrally controls the whole according to various programs and various APIs, and also executes various processes relating to image data upload (described later in detail).

The communication unit 131 communicates with the client 101A, the web server 102, and the relay server 103 via the network under the control of the control unit 130. The memory unit 132 is, for example, a hard disk drive or a flash memory, and stores various programs, various APIs, various image data pieces, service information of the upload services A to C, and the like. In the memory unit 132, a database is built for managing the uploaded image data.

The web server 102 is considered to have a configuration, for example, of omitting the display unit 113 and the operation input unit 114 from the configuration of the client 101A. That is, the web server 102 has an execution function equivalent to that of the client 101A. The web server 102 is then designed to execute various processes relating to image data upload (described later in detail) corresponding to a request from the client 101B.

1-2-3. Upload Sequence

Next, using FIGS. 8 to 14, a description is given to sequences for uploading image data from one of the clients 101 to one of the service providing servers 104 (which may also be referred to as upload sequences). Here, a description is given to an example of directly uploading image data from the client 101A to the service providing server 104B of the upload service B, which supports direct upload. The upload sequences are sequences executed mainly by the control unit 110 of the client 101A, the control unit 120 of the relay server 103, and the control unit 130 of the service providing server 104B in cooperation.

Figure 8:
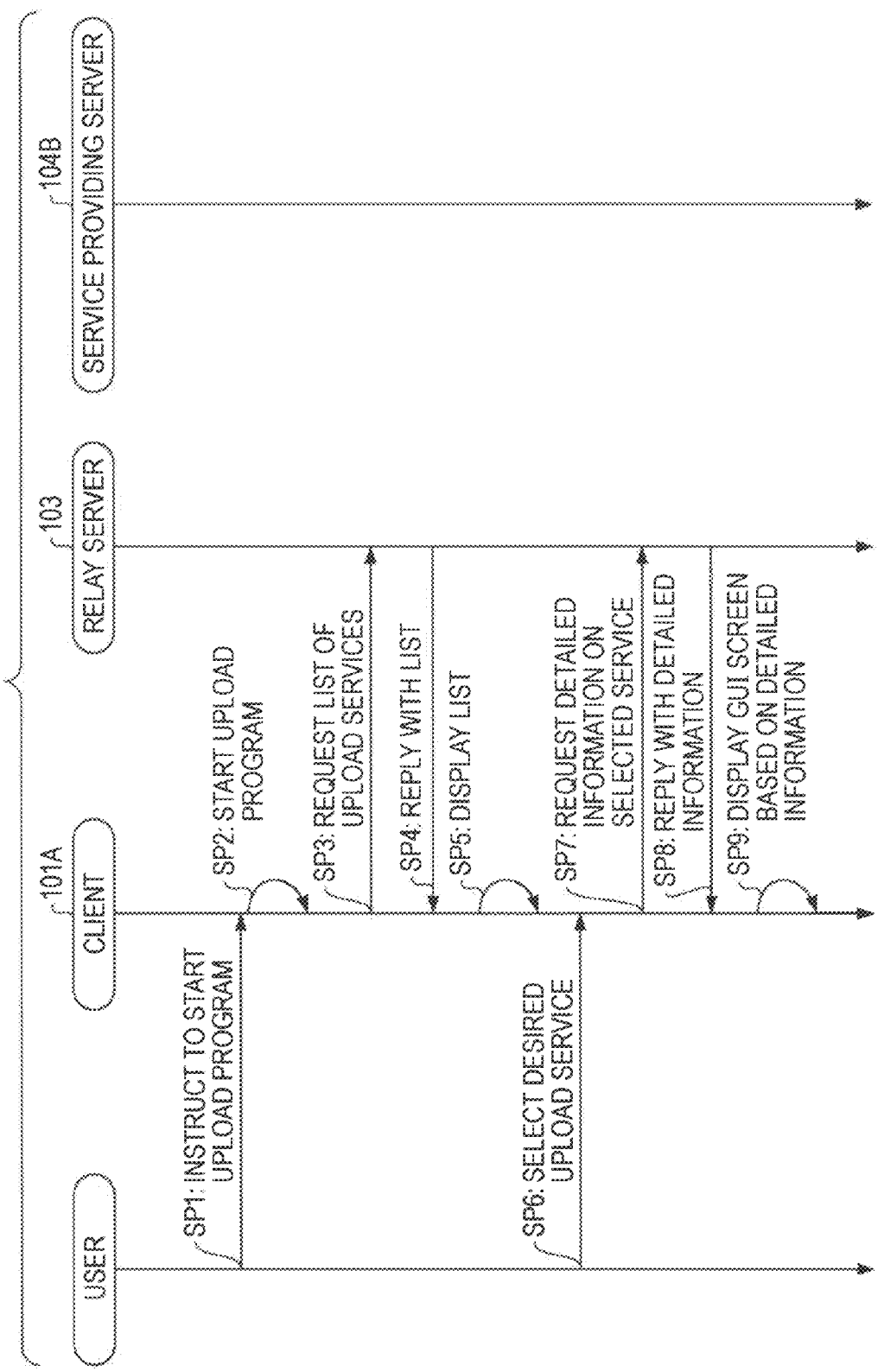
FIG. 8 is a schematic diagram showing an upload sequence.

First, in step SP1 shown in FIG. 8, it is assumed that a user instructs the client 101A to start an upload program via the operation input unit 114. The control unit 110 of the client 101A then starts the upload program stored in the memory unit 112 in step SP2. The upload program is a program common in each of the upload services A to C (which may also be referred to as a common program).

The control unit 110 of the client 101A requests a list of currently available upload services to the relay server 103 via the communication unit 111 in step SP3 according to the upload program.

Upon receiving the request via the communication unit 121, the control unit 120 of the relay server 103 generates a list of currently available upload services in step SP4 to reply to the client 101A with the list via the communication unit 121.

The relay server 103 is designed to occasionally obtain service information in which the latest service forms and the like are shown from each of the service providing servers 104A to 104C to store it in the memory unit 122. The control unit 120 of the relay server 103 then generates the list of upload services on the basis of the service information to submit it to the client 101A. In the list, a name of the provider and a part of the service forms (for example, supported format), for example, are entered per currently available upload service.

Upon receiving the list via the communication unit 111, the control unit 110 of the client 101A makes the display unit 113 display the list as a GUI screen (not shown) in step SP5. The client 101A can thus let the user confirm the currently available upload services.

The GUI screen is designed to allow selecting a desired upload service from the list. The user is then assumed to select a desired upload service (for example, the upload service B) from the list via the operation input unit 114 in step SP6. The control unit 110 of the client 101A then requests detailed information on the selected upload service to the relay server 103 via the communication unit 111 in step SP7.

Such a request for the detailed information is executed in such a manner that the control unit 110 of the client 101A calls an API for obtaining detailed information stored in the memory unit 112. Such an API for obtaining detailed information is an API common in each of the upload services A to C (which may also be referred to as a common API).

Upon receiving the request via the communication unit 121, the control unit 120 of the relay server 103 replies to the client 101A via the communication unit 121 with the detailed information on the selected upload service in step SP8.

Here, the control unit 120 of the relay server 103 is designed to extract information corresponding to the selected upload service from the service information of each of the upload services A to C stored in the memory unit 122 to reply with it as the detailed information.

In other words, in the detailed information, the contents shown in each of the items shown in FIGS. 3 and 4 are included as the information related to the service forms of the selected upload service. Accordingly, the service forms of the selected upload service (which of still image upload and video image upload is supported, if direct upload is supported, and the like) are understood from the detailed information.

The detailed information is, for example, text data described in an XML format, and also includes information to configure a GUI screen displayed by the display unit 113 of the client 101A when utilizing the selected upload service.

Figure 9:
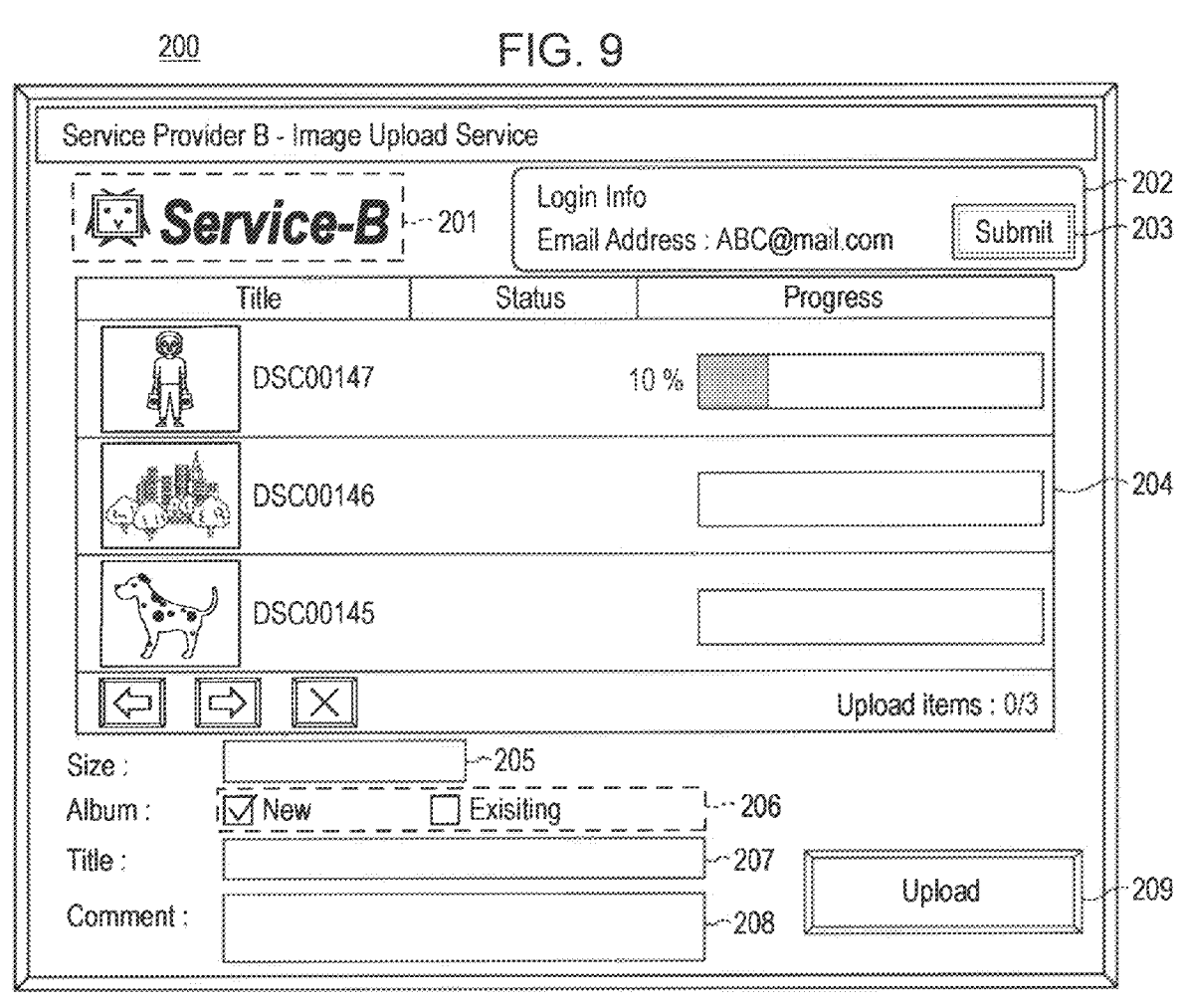

Upon receiving the detailed information via the communication unit 111, the control unit 110 of the client 101A makes the display unit 113 display a GUI screen based on the detailed information in step SP9. The GUI screen displayed at this point differs depending on the selected upload service. FIG. 9 illustrates a GUI screen 200 displayed at this point. The GUI screen 200 is a GUI screen displayed when the upload service B is selected.

In the GUI screen 200, icon and logo 201 of the provider B of the upload service B is displayed at the upper left. To the right of the icon and logo 201, a login information input field 202 for inputting information desired for login (which may also be referred to as login information) and a submit button 203 for giving an instruction to submit the inputted login information are provided.

Further in the GUI screen 200, at the center, an upload image display region 204 is provided to display a listing of image data to be uploaded. Below the upload image display region 204, a size display region 205 is provided to display the size of the image data to be uploaded.

Still below the size display region 205, an album specification check box 206 is provided to specify whether uploading the image data as a new album or by adding to an existing album.

Still below the album specification check box 206, a title input field 207 is provided to input a title of the image data. Yet below the title input field 207, a comment input field 208 is provided to input a description (comment) of the image data.

Further in the GUI screen 200, at the lower right, an upload execution button 209 is provided to give an instruction for upload execution.

It is designed that, via the GUI screen 200, the user can input the login information, select the image data to be uploaded, specify the album to store the image data, input the title and the description, execute upload, and the like.

The GUI screen 200 illustrated in FIG. 9 is one example, and an input field to input a tag, a check box to specify a publish/unpublish setting of the image data to be uploaded, and the like may also be provided based on the detailed information.

Figure 10:
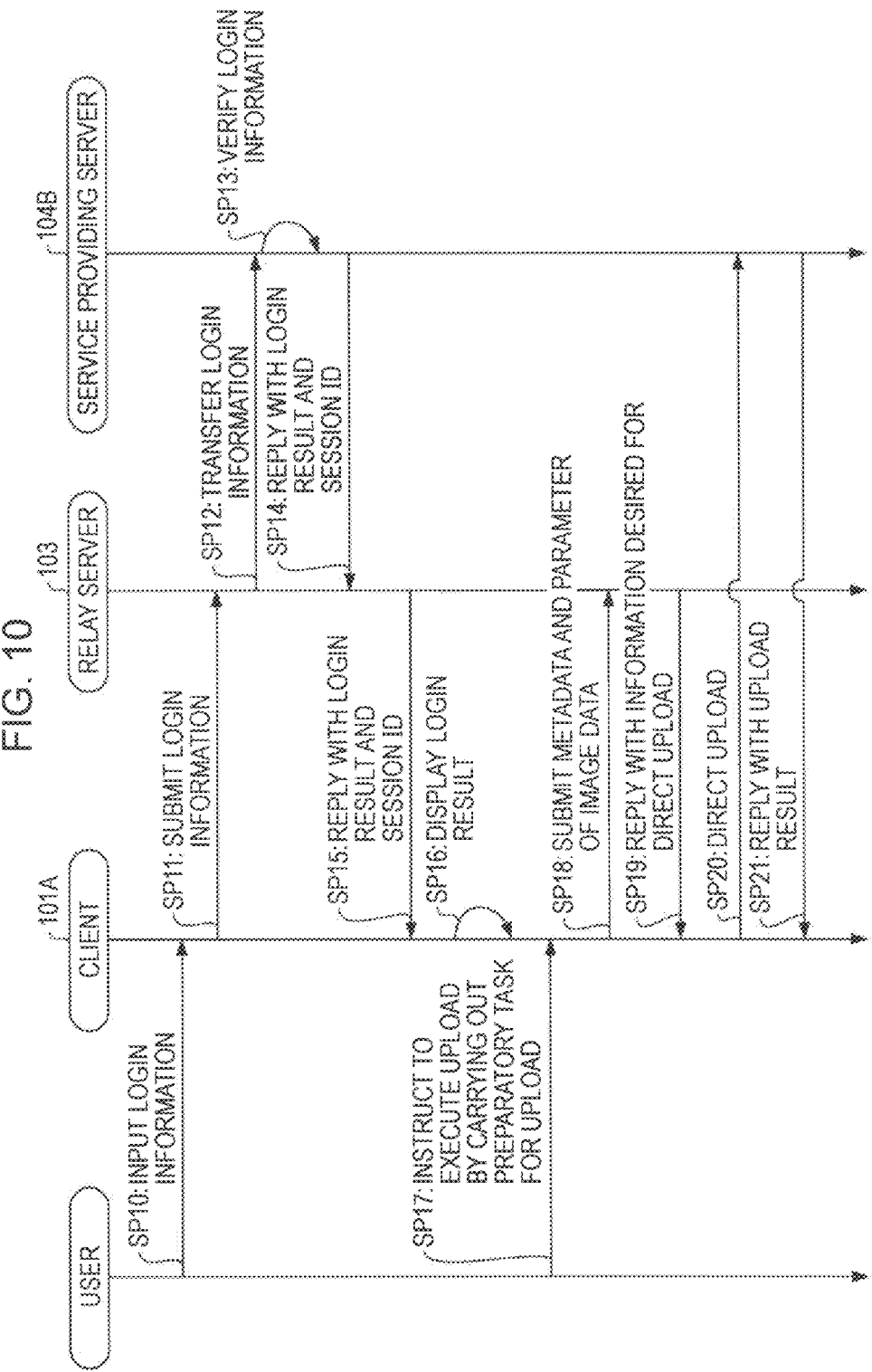
FIG. 10 is a schematic diagram showing a sequence that follows the sequence in FIG. 8.

The user is then assumed to input the login information in the login information input field 202 via the operation input unit 114 and presses the submit button 203 in step SP10 shown in FIG. 10. The control unit 110 of the client 101A then sends the inputted login information to the relay server 103 via the communication unit 111 in step SP11.

The submission of the login information by the client 101A is executed in such a manner that the control unit 110 of the client 101A calls an API for processing login stored in the memory unit 112. This API for processing login is also a common API. However, the login information to be submitted differs depending on the selected upload service.

Upon receiving the login information via the communication unit 121, the control unit 120 of the relay server 103 transfers the login information to the service providing server 104B of the selected upload service B via the communication unit 121 in step SP12.

The transfer of the login information to the service providing server 104B by the relay server 103 is executed by calling an API for processing login. Such an API for processing login is an API unique to each of the upload services A to C (which may also be referred to as a unique API). Such unique APIs are, for example, provided from each of the service providing servers 104A to 104C to be stored in the memory unit 122 of the relay server 103.

Upon receiving the login information via the communication unit 131, the control unit 130 of the service providing server 104B verifies the login information in step SP13. If it is confirmed as a login request from a user having a valid uploading authority as a result of the verification, the control unit 130 then issues a session ID for the relay server 103. The control unit 130 then submits the issued session ID and the login result indicating the login permission to the relay server 103 via the communication unit 131 in step SP14.

The session ID issued by the service providing server 104B is an ID utilized for keeping a session between the service providing server 104B and the relay server 103. That is, the following communication between the service providing server 104B and the relay server 103 is executed by assigning this session ID. Such a process can be thus omitted to submit the login information every time the relay server 103 accesses the service providing server 104B for verification of the login information in the service providing server 104B. Such a session ID may also be referred to as a session ID for a service providing server.

Upon receiving the login result and the session ID for a service providing server via the communication unit 121, the control unit 120 of the relay server 103 issues a session ID for the client 101A. The control unit 120 stores the session ID for a service providing server in the memory unit 122. The control unit 120 then submits the issued session ID and the received login result to the client 101A via the communication unit 121 in step SP15.

The session ID issued by the relay server 103 is an ID utilized for keeping a session between the relay server 103 and the client 101A. That is, the following communication between the relay server 103 and the client 101A is executed by assigning this session ID. Such a session ID may also be referred to as a session ID for a relay server.

Upon receiving the login result and the session ID for a relay server via the communication unit 111, the control unit 110 of the client 101A stores the session ID for a relay server in the memory unit 112. The control unit 110 displays on the GUI screen 200 that, for example, it has logged in normally on the basis of the received login result in step SP16.

Then in step SP17, it is assumed that the user presses the upload execution button 209, via the GUI screen 200, after carrying out a preparatory task for upload, such as selection of image data to be uploaded and inputs of a title and a description.

The control unit 110 of the client 101A then carries out direct upload because the detailed information on the upload service B received in advance indicates that the upload service B supports direct upload.

That is, the control unit 110 of the client 101A, firstly in step SP18, submits metadata of the uploading image data and its parameter composed of a file name and a size to the relay server 103 via the communication unit 111.

Here, the metadata is the title and the description of the image data, the ID of the album to store the image data, the publish/unpublish setting of the image data, and the like, inputted or specified via the GUI screen 200.

The submission of the metadata and the parameter is executed in such a manner that the control unit 110 of the client 101A calls a direct upload initiation API stored in the memory unit 112. Such a direct upload initiation API is a common API. The content of the submitted data is however different.

Upon receiving the metadata and the parameter, the control unit 120 of the relay server 103 submits the desired information for direct upload to the service providing server 104B to the client 101A in step SP19.

The desired information is generated on the basis of the metadata and the parameter received from the client 101A, the service information and the session ID for a service providing server obtained from the service providing server 104B of the upload location.

That is, the desired information includes, for example, the metadata and the parameter, the address of the upload location (the service providing server 104B, in this case), the data format of the image data, desired header information, the session ID for a service providing server, and the like.

Figure 11:
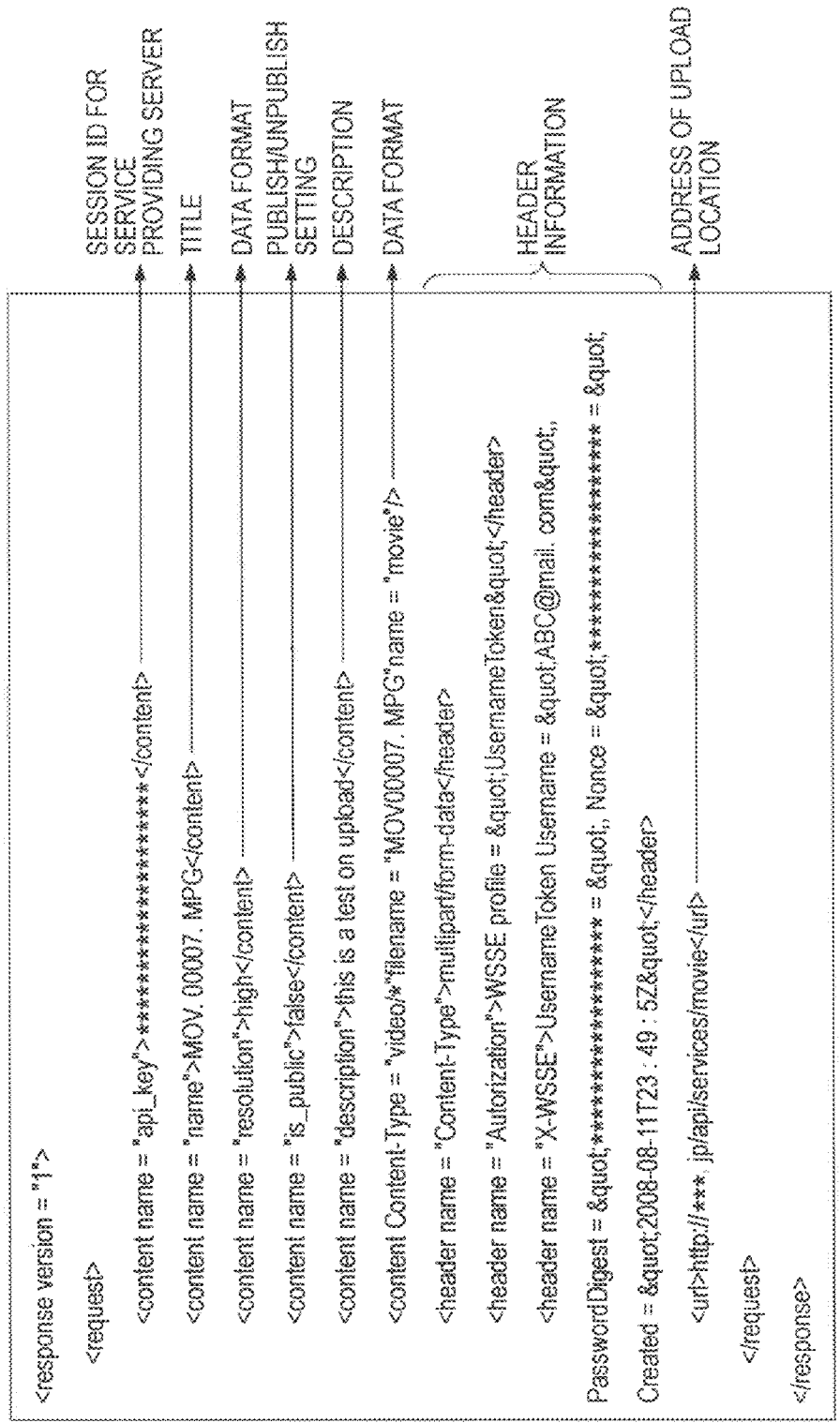
FIG. 11 illustrates desired information for direct upload.

FIG. 11 shows a specific example of the desired information. The desired information is, for example, text data described in an XML format. The desired information shown in FIG. 11 is an example of describing the session ID for a service providing server, the title, the description, the publish/unpublish setting, the data format, and the file name of the image data, the desired header information, and the like.

Upon receiving the desired information from the relay server 103, the control unit 110 of the client 101A appropriately processes the image data and metadata to be uploaded according to the desired information. For example, in a case of the image data to be uploaded not being in a specified data format, it converts to the specified data format.

Taking the image data and metadata as upload data, the control unit 110 further gives the specified information to the upload data according to the desired information. For example, the header information and the session ID for a service providing server entered in the desired information are given.

The control unit 110 then directly uploads the upload data, in step SP20 (FIG. 10), to the address of the upload location described in the desired information, in other words, the service providing server 104B. In other words, direct upload to the service providing server 104B is carried out.

Upon receiving the upload data from the client 101A via the communication unit 131, the control unit 130 of the service providing server 104B makes the memory unit 132 store the upload data and register it in a database for management.

Upon terminating direct upload from the client 101A, the control unit 130 then replies to the client 101A via the communication unit 131 with the result (which may also be referred to as an upload result) in step SP21.

Figure 12:
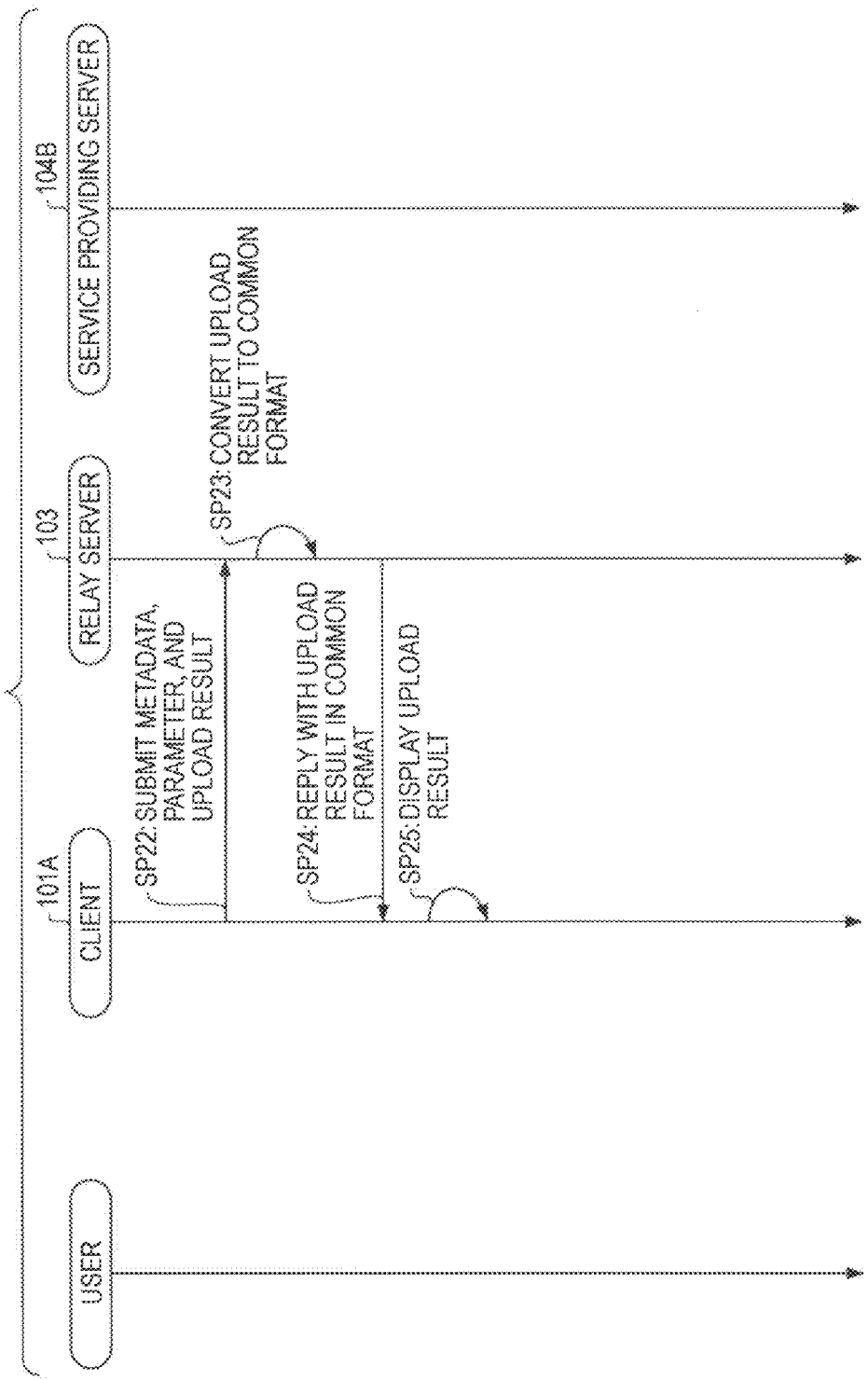
FIG. 12 is a schematic diagram showing a sequence that follows the sequence in FIG. 10.

Upon receiving the upload result, the control unit 110 of the client 101A transfers the upload result to the relay server 103 together with the metadata and the parameter of the uploaded image data in step SP22 (FIG. 12).

Here, the upload result provided from the service providing server 104B is in a format unique to each of the upload services (in this case, upload service B), and it is difficult for the client 101A to understand the contents directly.

In the upload system 100, it is designed that the client 101A submits the upload result to the relay server 103 to make the relay server 103 convert to a common format that can be recognized by the client 101A.

The submission of the metadata, the parameter, and the upload result is executed in such a manner that the control unit 110 of the client 101A calls a direct upload termination API stored in the memory unit 112. Such a direct upload termination API is an API identical to the direct upload initiation API other than the point of submitting the upload result, and is a common API.

Upon receiving the metadata, the parameter, and the upload result, the control unit 120 of the relay server 103 converts the upload result to the common format that can be recognized by the client 101A in step SP23.

The conversion of the upload result is executed in such a manner that the control unit 120 of the relay server 103 calls an API for converting an upload result stored in the memory unit 122. Such an API for converting an upload result is a unique API, and for example, is provided from each of the service providing servers 104A to 104C to be stored in the memory unit 122 of the relay server 103.

The control unit 120 then replies to the client 101A via the communication unit 121 with the upload result in the common format in step SP24.

Upon receiving the upload result in the common format, the control unit 110 of the client 101A displays that the upload is succeeded or failed on, for example, the GUI screen 200 on the basis of the upload result in step SP25.

With such an upload sequence, the upload system 100 is designed to directly upload image data from the client 101A to the service providing server 104B.

In the upload sequence described using FIGS. 8 to 12, the image data and the metadata are taken as the upload data for uploading in one time. However, depending on the upload service, there may be a request for two-phase upload, such as uploading image data followed by uploading the metadata separately.

Here, for example, it is assumed that the upload service C is a service requesting such two-phase upload.

In this case, the control unit 110 of the client 101A directly uploads the image data to the service providing server 104C in step SP20 described above (FIG. 10) according to the desired information received from the relay server 103. At this point, the control unit 110 does not upload the metadata.

After that, in step SP21, the result of uploading the image data is replied to the client 101A. Further in step SP22 (FIG. 13), the client 101A submits the upload result and the metadata and the parameter of the uploaded image data to the relay server 103.

Figure 13:
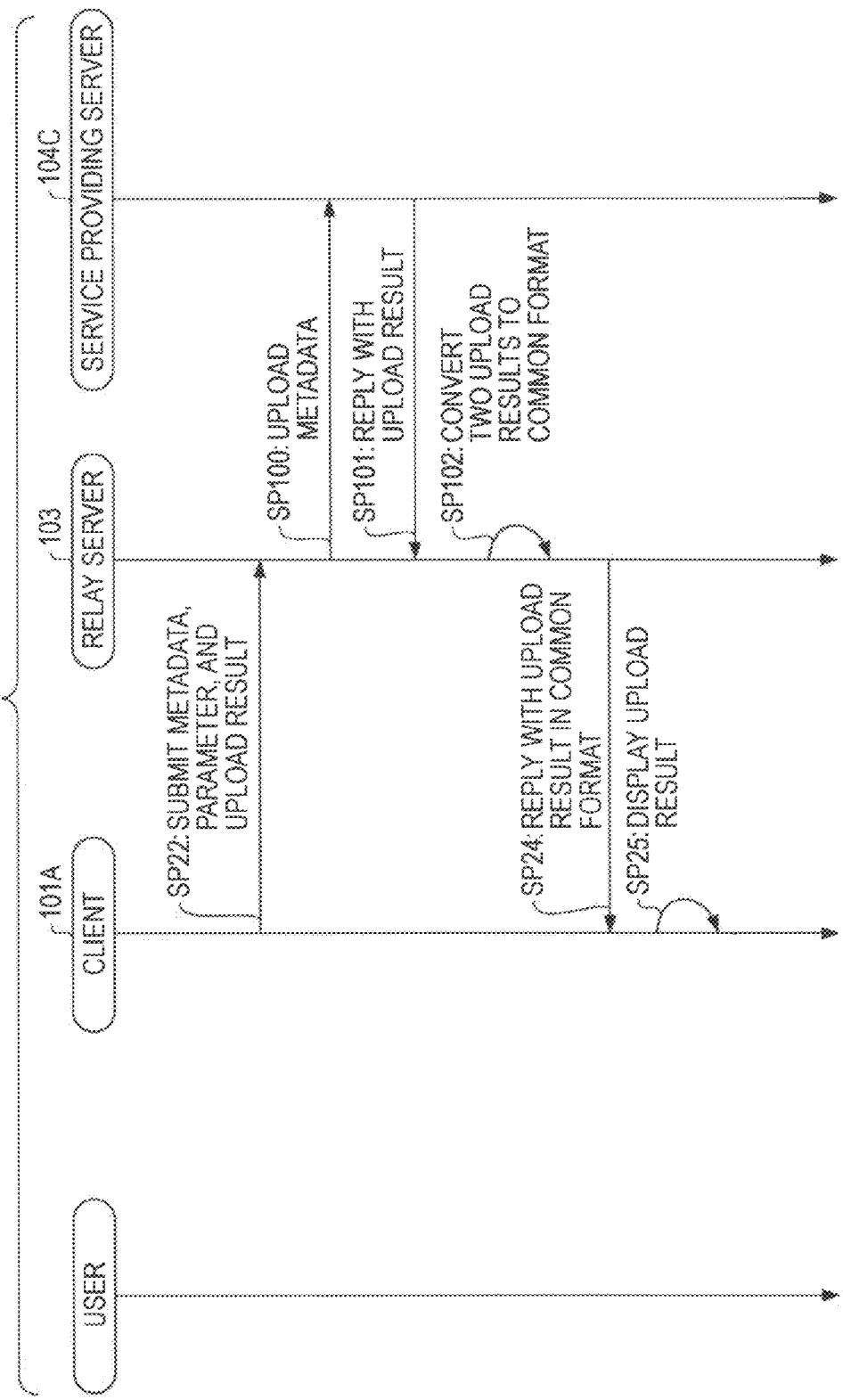
FIG. 13 is a schematic diagram showing an upload sequence in a case of uploading metadata separately.

Upon receiving the upload result, the metadata, and the parameter, the control unit 120 of the relay server 103 uploads the metadata to the service providing server 104C in step SP100 shown in FIG. 13.

In such a way, when two-phase upload of image data upload and metadata upload is requested, the image data is directly uploaded from the client 101A to the upload location firstly. After that, the metadata of the image data is relay uploaded from the client 101A via the relay server 103 to the upload location.

The upload of metadata by the relay server 103 to the service providing server 104C is executed by calling an upload API. Such an upload API is a unique API, and for example, is provided from each of the service providing servers 104A to 104C and stored in the memory unit 122 of the relay server 103.

Upon receiving the metadata, the control unit 130 of the service providing server 104C makes the memory unit 132 store the metadata and register it in the database by matching with the image data uploaded in advance for management.

Upon terminating the upload of the metadata from the relay server 103, the control unit 130 replies to the relay server 103 via the communication unit 131 with the upload result of the metadata in step SP101.

Upon receiving the upload result of the metadata, the control unit 120 of the relay server 103 converts the upload result and the upload result of the image data received in advance from the client 101A to the common format in step SP102.

The control unit 120 replies to the client 101A via the communication unit 121 with the upload result in the common format in step SP24. The control unit 110 of the client 101A displays that the upload is succeeded or failed on, for example, the GUI screen 200 in step SP25 on the basis of the upload result.

With such an upload sequence, the upload system 100 is designed to support two-phase upload of image data and metadata as well.

In the upload sequence described using FIGS. 8 to 12, the upload data is directly uploaded to the upload location. However, there is also an upload service not supporting direct upload. In a case of utilizing such an upload service, relay upload is carried out.

Here, for example, it is assumed that the upload service A is a service not supporting direct upload.

In this case, the control unit 110 of the client 101A submits the metadata and parameter of the image data to the relay server 103 in step SP18 described above (FIG. 10).

Figure 14:
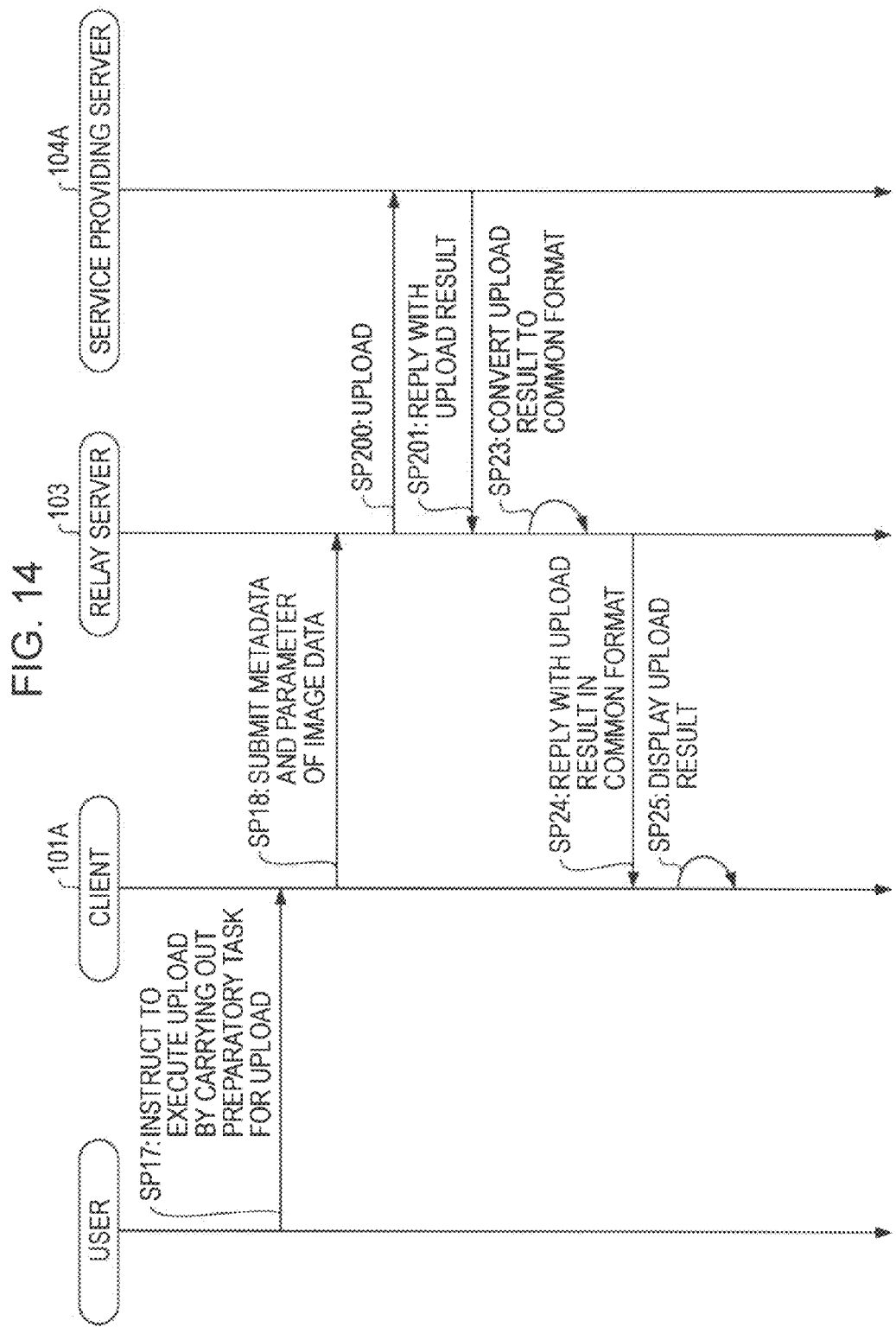
FIG. 14 is a schematic diagram showing an upload sequence in a case of relay upload.

Upon receiving the metadata and parameter of the image data, the control unit 120 of the relay server 103 uploads them as the upload data to the service providing server 104A in step SP200 shown in FIG. 14.

At this point, the control unit 120 of the relay server 103 appropriately processes the image data and the metadata and/or gives desired information to the upload data according to the service information obtained from the service providing server 104A.

This upload is executed in such a manner that the control unit 120 of the relay server 103 calls a relay upload API stored in the memory unit 112. Such a relay upload API is a unique API.

Upon receiving the upload data from the relay server 103, the control unit 130 of the service providing server 104A makes the memory unit 132 to store the upload data and register it in the database for management.

Upon terminating the upload from the relay server 103, the control unit 130 replies to the relay server 103 with the upload result in step SP201.

Upon receiving the upload result, the control unit 120 of the relay server 103 converts the upload result to the common format that can be understood by the client 101A in step SP23.

The control unit 120 replies to the client 101A with the upload result in the common format in step SP24.

Upon receiving the upload result in the common format, the control unit 110 of the client 101A displays that the upload is succeeded or failed on, for example, the GUI screen 200 on the basis of the upload result in step SP25.

With such an upload sequence, the upload system 100 is designed to relay upload the image data from the client 101A via the relay server 103 to the service providing server 104A.

As thus far described, in the upload system 100, this relay server 103 is designed to store and maintain the service information related to each of the upload services A to C.

The relay server 103 is then designed to obtain the desired information for direct upload from the service information to submit it to the client 101A.

The client 101A performs direct upload to the specified upload location according to the desired information.

Thus, in the upload system 100, the access concentration on the relay server 103 can be reduced compared to a case of uploading via the relay server 103 as in related art. As a result, the time taken for upload can be remarkably cut compared to a system that carries out relay upload for each time.

In the upload system 100, even when an upload service is added or deleted or an upload method is changed, it suffices to update the service information in the relay server 103 and the labors on the client 101A can be reduced.

In such a way, in the upload system 100, it is designed to allow quick and easy upload.

In the upload system 100, in a case of utilizing an upload service not supporting direct upload, it is designed to carry out relay upload via the relay server 103 similar to related art.

In the upload system 100, it is thus possible to provide both services of allowing direct upload and allowing only relay upload, and diverse upload services can be provided for users.

1-2-4. Procedure of Upload Processes Executed by Client

Figure 15:
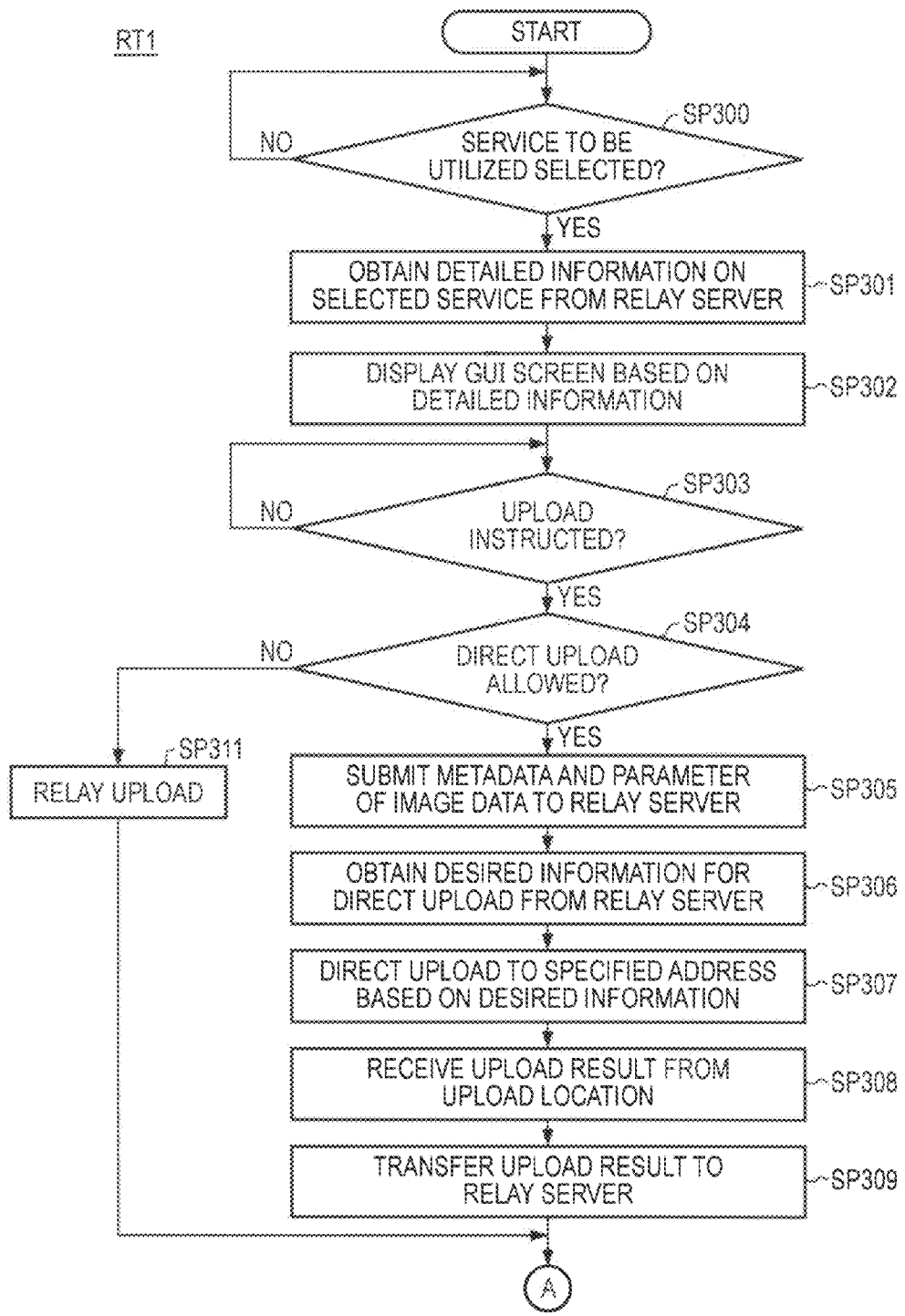
FIG. 15 is a flowchart illustrating an upload processing procedure executed by a client.
Figure 16:
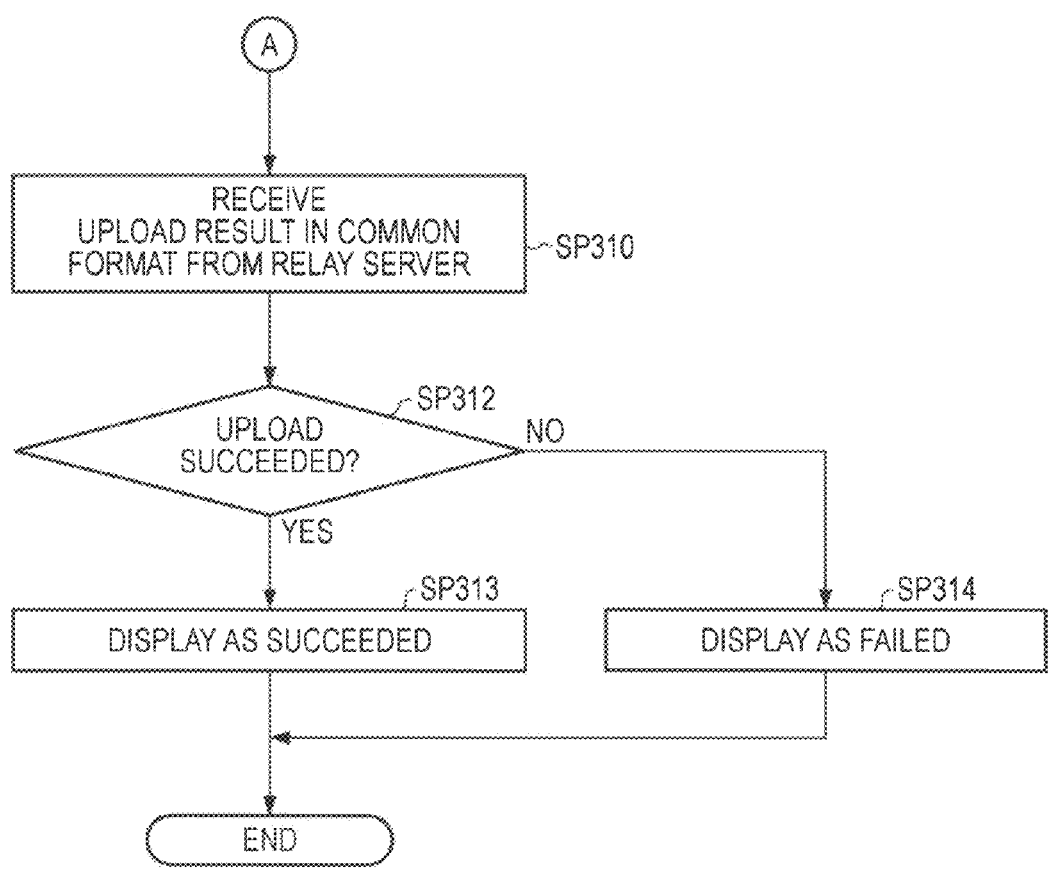
FIG. 16 is a flowchart following the flowchart in FIG. 15.

Next, using FIGS. 15 and 16, a description is given to a procedure RT1 of upload processes executed by the client 101A in the upload sequence described above (which may also be referred to as an upload processing procedure).

The upload processing procedure RT1 is a processing procedure executed in accordance with the upload program started by the control unit 110 of the client 101A.

As the upload program is instructed to start, the control unit 110 of the client 101A initiates the upload processing procedure RT1. The control unit 110 obtains a list of currently available upload services from the relay server 103 to display it on the display unit 113 and the sequence proceeds to step SP300.

In step SP300, the control unit 110 stands by for the selection of an upload service to be utilized from the displayed list, and when selected, it obtains a positive result in step SP300 and the sequence proceeds to step SP301.

In step SP301, the control unit 110 obtains detailed information on the selected upload service from the relay server 103 and the sequence proceeds to step SP302. In step SP302, the control unit 110 displays the GUI screen 200 as illustrated in FIG. 9 according to the obtained detailed information on the display unit 113 and the sequence proceeds to step SP303.

In step SP303, the control unit 110 stands by for an instruction of upload via the displayed GUI screen 200, and when instructed, it obtains a positive result in step SP303 and the sequence proceeds to step SP304.

In step SP304, the control unit 110 determines whether or not the upload service utilized at this time is a service supporting direct upload on the basis of the detailed information received in advance.

When the control unit 110 obtains a positive result in step SP304 because the upload service utilized at this time is a service supporting direct upload, the sequence proceeds to step SP305 at this point.

In step SP305, the control unit 110 submits the metadata of the image data to be uploaded and its parameter (the file name and the size of the image data) to the relay server 103 and the sequence proceeds to step SP306.

In step SP306, the control unit 110 receives the desired information for direct upload that is in a reply from the relay server 103 as a result of the submission of the metadata and the parameter and the sequence proceeds to step SP307.

In step SP307, the control unit 110 submits the image data and the metadata to be uploaded as the upload data to the specified address on the basis of the received desired information (in other words, carries out direct upload) and the sequence proceeds to step SP308.

In step SP308, the control unit 110 receives the upload result in a reply from the service providing server 104 of the upload location and the sequence proceeds to step SP309. In step SP309, the control unit 110 transfers the received upload result to the relay server 103 and the sequence proceeds to step SP310 (FIG. 16).

In contrast, when the control unit 110 obtains a negative result in step SP304 described above (FIG. 15) because the upload service utilized at this time is a service not supporting direct upload, the sequence proceeds to step SP311.

In step SP311, the control unit 110 submits the image data and the metadata to be uploaded to the relay server 103 (in other words, carries out relay upload) and the sequence proceeds to step SP310 (FIG. 16).

In step SP310, the control unit 110 receives the upload result in the common format in a reply from the relay server 103 and the sequence proceeds to step SP312. In step SP312, the control unit 110 determines whether or not the contents of the upload result in the common format indicates a success of the upload.

When the control unit 110 obtains a positive result in step SP312 because the contents of the upload result indicate a success of the upload, the sequence proceeds to step SP313. In step SP313, the control unit 110 displays that the upload is succeeded on the GUI screen 200 to terminate the upload processing procedure RT1.

In contrast, when the control unit 110 obtains a negative result in step SP312 described above because the contents of the upload result indicate a failure of the upload, the sequence proceeds to step SP314. In step SP314, the control unit 110 displays that the upload is failed on the GUI screen 200 to terminate the upload processing procedure RT1.

In accordance with such an upload processing procedure RT1, the client 101A is designed to carry out direct upload or relay upload.

1-2-5. Behavior and Effects

In the above configuration, in the upload system 100, the relay server 103 stores and maintains the service information related to each of the upload services A to C. The relay server 103 is then designed to obtain the desired information for direct upload from the service information to provide it to the client 101A.

On the other hand, the client 101A determines whether or not the upload service selected by the user supports direct upload on the basis of the detailed information obtained from the relay server 103. Then, in a case of the selected upload service supporting direct upload, the client 101A utilizes the selected upload service to carry out direct upload.

At this point, the client 101A firstly obtains the desired information from the relay server 103 for direct upload utilizing the upload service.

The client 101A then carries out direct upload to the upload location specified by the upload service according to the desired information. In other words, data is uploaded not via the relay server 103, but directly to the upload location.

Thus, in the upload system 100, access concentration on the relay server 103 can be reduced compared to a case of uploading via the relay server 103. As a result, the time taken for upload can be remarkably cut compared to a system that carries out relay upload for each time.

In the upload system 100, even when an upload service is added or deleted or an upload method is changed, it suffices to update the service information in the relay server 103 and labors on the client 101A can be reduced. In other words, it can prevent an increase in user tasks in the client 101A.

Accordingly, in the upload system 100, it is possible to upload quickly and easily.

According to the above configuration, the upload system 100 can remarkably cut the time taken for upload compared to a system that carries out relay upload for each time as in related art. In the upload system 100, even when an upload service is added or deleted or an upload method is changed, it suffices to update the service information in the relay server 103, and it is possible to prevent an increase in user tasks in the client 101A. That is, in the upload system 100, it is possible to upload quickly while keeping the ease of upload, which is an advantage in a case of relay upload as in related art.

2. Another Embodiment

Next, a description is given to another embodiment. In the embodiment described earlier, direct upload is carried out when the utilized upload service supports direct upload. In contrast, in the other embodiment, it is designed to select either of direct upload and relay upload according to the network traffic.

Since the configurations of the upload system 100, the clients 101A and 101B, the relay server 103, and the service providing servers 104A to 104C are similar to those of the embodiment described earlier, they should be referred to the embodiment described earlier. Therefore, a description is given here only to an upload processing procedure RT2 executed by the client 101A using FIGS. 17 and 18.

Figure 17:
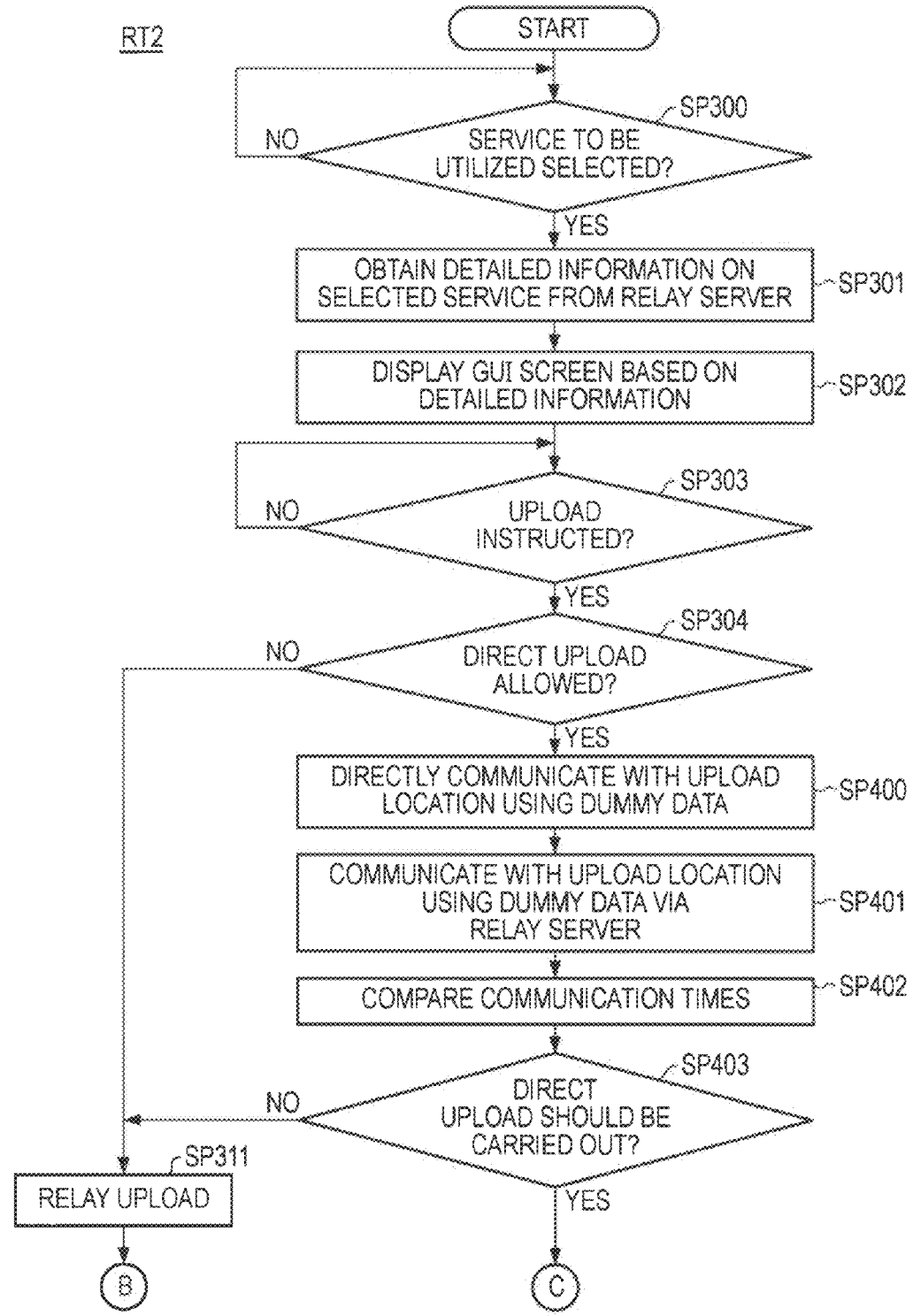
FIG. 17 is a flowchart illustrating an upload processing procedure executed by a client in another embodiment.
Figure 18:
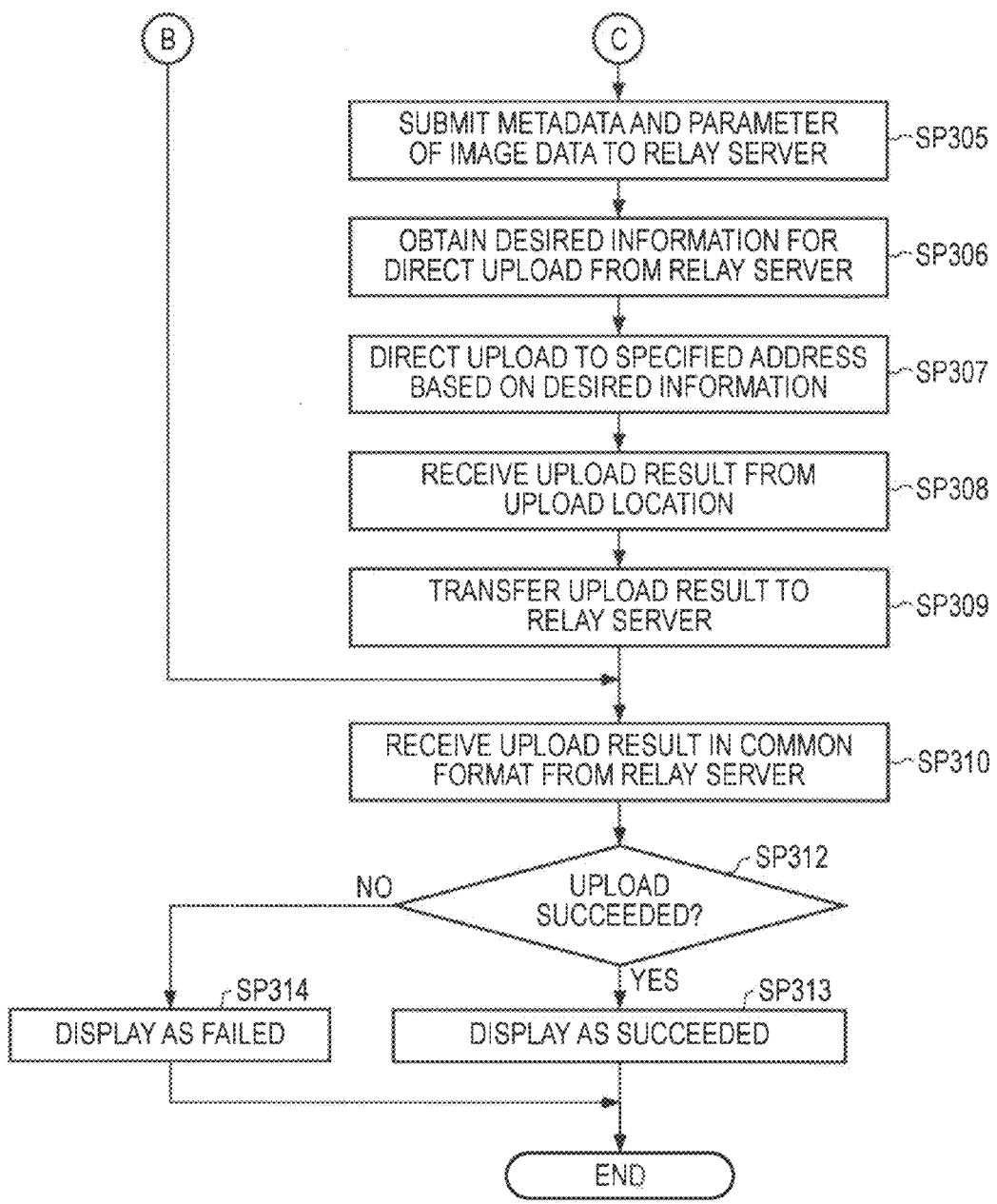
FIG. 18 is a flowchart following the flowchart in FIG. 17.

In the upload processing procedure RT2 shown in FIGS. 17 and 18, steps identical to those in the upload processing procedure RT1 in the embodiment described earlier are assigned identical step numbers.

2-1. Procedure of Upload Processes Executed by Client

As the upload program is instructed to start, the control unit 110 of the client 101A initiates the upload processing procedure RT2. The control unit 110 then carries out the processes in steps SP300 to SP303 as in the upload processing procedure RT1 of the embodiment described earlier, and the sequence proceeds to step SP304.

In the other embodiment, the address of the upload location is assumed to be included, in addition to the service forms of the selected upload service, in the detailed information on the upload service obtained from the relay server 103 in step SP301.

In step SP304, the control unit 110 determines whether or not the upload service utilized at this time supports direct upload on the basis of the detailed information received in advance.

When the control unit 110 obtains a positive result in step SP304 because the upload service utilized at this time is a service supporting direct upload, the sequence proceeds to step SP400 at this point.

In step SP400, the control unit 110 submits dummy data directly to the service providing server 104 of the upload location on the basis of the address of the upload location included in the detailed information. Such dummy data is dummy upload data, and assumed to be data smaller in size compared to an actual upload data (for example, several tens in kilobyte).

The service providing server 104, which receives the dummy data, returns some response (for example, an error) to the client 101A. The control unit 110 of the client 101A measures the time from when submitting the dummy data until the response is returned (that is, a communication time).

The communication time indicates the traffic in a case of direct communication of the client 101A with the service providing server 104 of the upload location. The control unit 110 then stores the communication time as a direct upload time in the memory unit 112 and the sequence proceeds to step SP401.

In step SP401, the control unit 110 submits the dummy data, which is identical to the dummy data submitted in step SP400, to the relay server 103. The relay server 103, which has received the dummy data, submits the dummy data to the service providing server 104 to which the client 101A has directly submitted the dummy data.

The service providing server 104 which has received the dummy data returns some response (for example, an error) to the relay server 103. This response is then transferred from the relay server 103 to the client 101A. The control unit 110 of the client 101A measures the time from when the dummy data is submitted until the response is returned (that is, a communication time). The communication time indicates the traffic when the client 101A communicates with the service providing server 104 of the upload location via the relay server 103. The control unit 110 then stores the communication time as a relay upload time in the memory unit 112 and the sequence proceeds to step SP402.

In step SP402, the control unit 110 compares the direct upload time with the relay upload time and the sequence proceeds to step SP403. In step SP403, the control unit 110 determines whether to perform direct upload or not on the basis of the result of comparison in step SP402.

Specifically, the control unit 110 estimates that, when the direct upload time is shorter than the relay upload time, there is a less traffic in direct upload than in relay upload. In other words, it estimates that the direct upload takes a shorter time for upload and is more effective. At this point, the control unit 110 is designed to determine that direct upload should be carried out.

In contrast, when the expected direct upload time is longer than the expected relay upload time, the control unit 110 estimates that there is a less traffic in relay upload than in direct upload. In other words, it estimates that the relay upload takes a shorter time for upload and is more effective. At this point, the control unit 110 is designed to determine that relay upload should be carried out.

When the control unit 110 determines execution of direct upload and obtains a positive result in step SP403, the sequence proceeds to step SP305 (FIG. 18). The control unit 110 then carries out direct upload of the upload data by processing steps SP305 to SP309 as in the upload processing procedure RT1 of the embodiment described earlier and the sequence proceeds to step SP310.

In contrast, when the control unit 110 determines execution of relay upload and obtains a negative result in step SP403 described above, the sequence proceeds to step SP311. The control unit 110 then carries out relay upload of the upload data in cooperates with the relay server 103 in step SP311 and the sequence proceeds to step SP310.

The control unit 110 then performs processes in steps SP310 to SP313 or SP314 as in the upload processing procedure RT1 of the embodiment described earlier, and then terminates the upload processing procedure RT2.

In accordance with such an upload processing procedure RT2, the client 101A is designed to carry out direct upload or relay upload.

In such a way, in the other embodiment, the client 101A is designed to select the one which is estimated to terminate upload in a shorter time from direct upload and relay upload according to the network traffic.

That is, the client 101A carries out relay upload as long as relay upload is estimated to terminate in a shorter upload time even for a service supporting direct upload.

Thus in the other embodiment, it is possible to upload more quickly compared to a case of carrying out direct upload for each time utilizing a service supporting direct upload.

There may be a case in which the physical distance between the relay server 103 and the service providing server 104 is longer than the physical distance between the client 101A and the service providing server 104. In such a case, the time for upload may take longer in direct upload than in relay upload. Even in this case, the other embodiment can upload more quickly in such a manner that the client 101A estimates the situation from the comparison of the communication times described above and selects relay upload.

3. Still Another Embodiments

3-1. Still Another Embodiment 1

In the embodiment described first, when direct upload is failed, the client 101A indicates the failure on the GUI screen 200 and terminates the upload processing.

Without limiting to this, when direct upload is failed, the client 101 may also relay upload the same upload data again.

That is, when the upload result received from the relay server 103 shows a failure of direct upload, the control unit 110 of the client 101A submits the same image data and metadata to the relay server 103.

The relay server 103 uploads the image data and the metadata as the upload data to the service providing server 104.

In such a way, by designing to carry out relay upload when direct upload is failed, data can be uploaded more certainly.

Without limiting to this, when an upload result is not returned even after passing a predetermined time since direct upload has initiated, the client 101 may also cancel the direct upload, and instead, carry out relay upload.

The predetermined time in such a case (which may also be referred to as a timeout period) is assumed to be set per upload service corresponding to, for example, the format (video image or still image), the size, and the like of the image data to be uploaded.

The timeout period is then stored and maintained in the relay server 103 as, for example, the service information of each of the upload services to be also provided to the client 101A as the detailed information.

That is, the control unit 110 of the client 101A cancels direct upload when the upload result is not returned even after passing a timeout period included in the detailed information since the direct upload has initiated.

The control unit 110 of the client 101A then submits the same image data and metadata to the relay server 103. The relay server 103 uploads the image data and the metadata as the upload data to the service providing server 104.

In such a way, although depending on the traffic condition, it is possible to upload data more quickly than continuing direct upload in many cases.

Without limiting to this, direct upload and relay upload may also be carried out in parallel not cancelling the direct upload after passing the timeout period.

In this case, when either upload result is returned, the control unit 110 of the client 101A cancels the other upload.

3-2. Still Another Embodiment 2

In the embodiment described first, upon receiving the upload result from the service providing server 104, the client 101A transfers it, together with the metadata and the parameter of the uploaded image data, to the relay server 103.

Without limiting to this, only the upload result may also be transferred to the relay server 103 at this point.

Actually, the client 101A has submitted the metadata and the parameter of the image data to be uploaded also immediately before obtaining the desired information from the relay server 103. Therefore, as long as the relay server 103 makes the memory unit 122 store the metadata and the parameter received at this point, they may not be transferred from the client 101A to the relay server 103 again.

3-3. Still Another Embodiment 3

Further in the embodiment described first, in a case of utilizing a service in which the image data and the metadata should be uploaded separately, the image data is directly uploaded and the metadata is relay uploaded.

Without limiting to this, the metadata may also be directly uploaded. In this case, however, the relay server 103 also provides the desired information to the client 101A for direct upload of the metadata.

3-4. Still Another Embodiment 4

Further in the embodiment described first, the relay server 103 provides the text data, which is described in an XML format as the desired information for direct upload, to the client 101A.

Without limiting to this, the relay server 103 may also provide a direct upload API to the client 101A as the desired information. Such an API is a unique API, and for example, is provided from each of the service providing servers 104A to 104C and stored in the memory unit 122 of the relay server 103.

In this case, the client 101A may then carry out direct upload by calling the direct upload API.

3-5. Still Another Embodiment 5

Further in the embodiment described first, in a case of carrying out direct upload from the client 101A, the service providing server 104 directly replies to the client 101A with the upload result.

Without limiting to this, the upload result may also be in a reply to the relay server 103 for each time, and the relay server 103 may also convert the upload result to the common format and then transfer to the client 101A.

In such a way, the client 101A does not have to transfer the upload result in a reply from the service providing server 104 to the relay server 103, and the load on the client 101A can be more reduced.

3-6. Still Another Embodiment 6

Further in the embodiment described first, the client 101A obtains the detailed information in which whether or not the upload service to be utilized supports direct upload and the like are shown from the relay server 103. Then, from the detailed information, the client 101A determines whether or not the upload service to be utilized supports direct upload.

In other words, in the embodiment described first, the relay server 103 notifies the client 101A of whether or not the upload service to be utilized supports direct upload via the detailed information.

Without limiting to this, the client 101A may also directly inquire to the relay server 103 whether or not the upload service to be utilized supports direct upload.

In this case, the control unit 120 of the relay server 103 determines whether or not the upload service to be utilized supports direct upload on the basis of the stored and maintained service information. It may then reply to the client 101A with the result of determination.

3-7. Still Another Embodiment 7

Further in the other embodiment described earlier, either of the direct upload and relay upload is selected based on the network traffic.

Without limiting to this, either of direct upload and relay upload may also be selected based on, for example, the image data format.

In this case, the client 101A selects direct upload, for example, when the format of the image data to be uploaded is a video image, to directly upload the image data. In contrast, when the format of the image data to be uploaded is a still image, the client 101A selects relay upload to relay upload the image data.

In such a way as well, access concentration on the relay server 103 can also be reduced compared to a system that only carries out relay upload. By changing an upload path corresponding to the format of the image data in such a way, the network traffic can be distributed.

Without limiting to this, the selection of either direct upload or relay upload may also be made based on, for example, the size of the image data.

In this case, the client 101A selects direct upload, when, for example, the size of the image data to be uploaded is not less than a predetermined size to direct upload the image data. In contrast, when the size of the image data to be uploaded is less than the predetermined size, the client 101A selects relay upload to relay upload the image data.

In such a way as well, access concentration on the relay server 103 can also be reduced compared to a system that only carries out relay upload. By changing an upload path corresponding to the size of the image data in such a way, the network traffic can be distributed.

3-8. Still Another Embodiment 8

The present invention is not limited to the embodiments described so far. That is, embodiments of the present invention also cover forms of any combinations of part or all of these embodiments described so far, and forms of extracting part of them.

For example, the other embodiment described earlier and still the other embodiment 1 may also be combined. In other words, as in the other embodiment described earlier, the client 101A selects either of direct upload and relay upload. As a result of carrying out the selected upload, it is assumed that selected upload is failed. Then, the client 101A may also carry out the other type of upload as in still the other embodiment 1.

The present application contains subject matter related to that disclosed in Japanese Priority Patent Application JP 2009-030112 filed in the Japan Patent Office on Feb. 12, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a communication unit; and
a control unit controlling the communication unit
to inquire, to a server storing service information of each of a plurality of upload services, if one upload service allows direct upload,
when the one upload service allows the direct upload, to obtain desired information from the server for directly uploading data to the one upload service, and
to directly upload the data to the one upload service according to the desired information obtained from the server.

2. The communication device according to claim 1, wherein when the one upload service allows the direct upload and also upload via the server, the control unit selects either the direct upload or the upload via the server.

3. The communication device according to claim 2, wherein the control unit selects either the direct upload or the upload via the server according to a network traffic.

4. The communication device according to claim 3, wherein when uploading the data, the control unit measures a first communication time taken for the direct upload using dummy data and a second communication time taken for the upload via the server using the dummy data, and determines the network traffic according to the first communication time and the second communication time.

5. The communication device according to claim 2, wherein when the direct upload fails, the control unit selects the upload via the server.

6. The communication device according to claim 1, wherein when the one upload service does not allow the direct upload and allows upload via the server, the control unit selects the upload via the server.

7. The communication device according to claim 1, wherein the control unit controls the communication unit
to transfer an upload result to the server, the upload result originating in a reply from the one upload service as a result of carrying out the direct upload, and
to receive the upload result from the server, the upload result being converted in the server to a format that the communication device can recognize.

8. The communication device according to claim 1, wherein:
the data includes content data and metadata; and
the control unit uploads the content data by the direct upload while uploading the metadata by the upload via the server.

9. A server comprising:
a communication unit;
a memory unit storing service information of each of a plurality of upload services; and
a control unit controlling the communication unit
to respond to an inquiry from a communication device if one upload service among the plurality of upload services allows direct upload according to the service information, and
when the one upload service allows direct upload, to submit desired information to the communication device for directly uploading data to the one upload service.

10. The server according to claim 9, wherein the control unit
converts an upload result to a format that the communication device can recognize, the upload result received from the communication device as a result of the direct upload of data to the one upload service, and controls the communication unit to reply to the communication device.

11. A non-transitory medium storing a program which when executed causes a communication device execute steps comprising:
inquiring, to a server storing service information of each of a plurality of upload services, if one upload service allows direct upload by controlling a communication unit;
when the one upload service allows the direct upload, obtaining desired information from the server for directly uploading data to the one upload service by controlling the communication unit; and
uploading the data directly to the upload service by controlling the communication unit according to the desired information obtained from the server.

12. A communication system comprising a communication device and a server, wherein
the communication device includes
a communication unit, and
a control unit controlling the communication unit
to inquire, to a server storing service information of each of a plurality of upload services, if one upload service allows direct upload
when the one upload service allows the direct upload, to obtain desired information from the server for directly uploading data to the one upload service, and
to directly upload the data to the upload service according to the desired information obtained from the server, and
the server includes
a memory unit storing the service information of each of the plurality of upload services,
a communication unit, and
a control unit controlling the communication unit
to respond to an inquiry from the communication device if the direct upload is allowed according to the service information, and
when the one upload service allows the direct upload, to submit the desired information to the communication device for directly uploading the data to the one upload service.

13. The communication device according to claim 1, wherein the direct upload is an upload of data from the communication device to the one upload service not via the server.

14. The communication system according to claim 9, wherein the control unit controls to update the service information of memory unit when an upload service of the plurality of upload services is added, deleted, or changed.

15. The communication device according to claim 5, wherein when an upload result is not returned in response to the direct upload, it is determined that the direct upload has failed.

16. The communication device according to claim 5, wherein when an upload result is not returned in response to the direct upload after passing of a predetermined time, it is determined that the direct upload has failed.

17. The communication device according to claim 1, wherein the desired information includes a direct upload API.

18. The communication device according to claim 1, wherein the desired information includes at least one of a session ID, a title, a description, a publish/unpublish setting, a data format, a file name, and desired header information.

19. The communication device according to claim 13, wherein the control unit controls the communication unit to directly upload the data to the one upload service with a session ID obtained from the server.

20. The communication device according to claim 2, wherein the control unit selects either the direct upload or the upload via the server based upon an image data format of the data.

21. The communication device according to claim 1, wherein the plurality of upload services are connected to a network separate from the server.

* * * * *